US011221404B1

(12) United States Patent
DeSalvo et al.

(10) Patent No.: US 11,221,404 B1
(45) Date of Patent: Jan. 11, 2022

(54) DEVICES, SYSTEMS, AND METHODS FOR RADAR-BASED ARTIFICIAL REALITY TRACKING USING ZERO-CROSSING DETECTION

(71) Applicant: Facebook Technologies, LLC, Menlo Park, CA (US)

(72) Inventors: Riccardo DeSalvo, Pasadena, CA (US); Giuseppe Castaldi, Apice (IT); Andrea Cusano, Caserta (IT); Vincenzo Galdi, Benevento (IT); Paolo Mattera, Benevento (IT); Roberto Parente, Cerreto Sannita (IT); Fereydoun Daneshgaran, La Crescenta, CA (US); Joseph Minh Tien, Alhambra, CA (US); Dustin Krogstad, Chino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 209 days.

(21) Appl. No.: 16/526,736

(22) Filed: Jul. 30, 2019

Related U.S. Application Data

(60) Provisional application No. 62/802,458, filed on Feb. 7, 2019.

(51) Int. Cl.
*G01S 13/76* (2006.01)
*G01S 13/75* (2006.01)
(Continued)

(52) U.S. Cl.
CPC ............ *G01S 13/767* (2013.01); *G01S 13/04* (2013.01); *G01S 13/06* (2013.01); *G01S 13/75* (2013.01)

(58) Field of Classification Search
CPC ........ G01S 13/767; G01S 13/04; G01S 13/06; G01S 13/75
See application file for complete search history.

(56) References Cited

U.S. PATENT DOCUMENTS 4,599,618 A * 7/1986 Haendel ................ G01S 13/341
                                                        342/103
8,638,254 B2 * 1/2014 Itoh ........................ G01S 13/584
                                                         342/70

(Continued)

OTHER PUBLICATIONS

Desalvo R., "Devices, Systems, and Methods for Radar-Based Artificial Reality Tracking," U.S. Appl. No. 16/515,066, filed Jul. 18, 2019, 84 pages.

(Continued)

*Primary Examiner* — Timothy X Pham
(74) *Attorney, Agent, or Firm* — FisherBroyles, LLP

(57) ABSTRACT

The disclosed computer-implemented method may include transmitting, by at least one radar device, a frequency-modulated radar signal to at least one transponder located within a physical environment surrounding a user, detecting, by a processing device communicatively coupled to the at least one radar device a signal returned to the at least one radar device from the at least one transponder in response to the frequency-modulated radar signal, determining a beat frequency of the returned signal by performing a zero-crossing analysis of the returned signal in the time domain, and calculating, based at least in part on the beat frequency of the returned signal, a distance between the at least one transponder and the at least one radar device. Various other methods, systems, and computer-readable media are also disclosed.

18 Claims, 15 Drawing Sheets

(51) Int. Cl.
*G01S 13/04* (2006.01)
*G01S 13/06* (2006.01)

(56) References Cited

U.S. PATENT DOCUMENTS

| | | | |
|---|---|---|---|
| 2008/0088503 A1* | 4/2008 | Beasley | G01S 7/4056 342/200 |
| 2008/0150899 A1 | 6/2008 | Lin | |
| 2008/0291158 A1 | 11/2008 | Park et al. | |
| 2009/0212920 A1 | 8/2009 | Yang | |
| 2009/0289831 A1* | 11/2009 | Akita | G01S 13/931 342/70 |
| 2011/0007035 A1 | 1/2011 | Shai | |
| 2015/0021481 A1 | 1/2015 | Cavallaro et al. | |
| 2018/0074600 A1 | 3/2018 | Park | |
| 2018/0088339 A1 | 3/2018 | Aruga | |
| 2019/0064341 A1* | 2/2019 | Bunch | G01S 13/955 |
| 2019/0182415 A1 | 6/2019 | Sivan | |
| 2019/0200914 A1 | 7/2019 | Wagner et al. | |
| 2020/0089314 A1 | 3/2020 | Poupyrev et al. | |
| 2020/0174095 A1* | 6/2020 | Altintas | H04L 27/2697 |

OTHER PUBLICATIONS

Desalvo R., et al., "Devices, Systems, And Methods For Radar-Based Artifical Reality Tracking," U.S. Appl. No. 62/802,458, filed Jul. 2, 2019, 61 pages.

Desalvo R., et al., "Devices, Systems, and Methods for Radar-Based Artificial Reality Tracking," U.S. Appl. No. 16/515,067, filed Jul. 18, 2019, 78 pages.

Desalvo R., et al., "Devices, Systems, and Methods for Radar-Based Artificial Reality Tracking", U.S. Appl. No. 16/391,229, filed Apr. 22, 2019, 89 pages.

"Radar Basics," Apr. 14, 2014, pp. 1-6, Retrieved from the Internet: URL: http://www.radartutorial.eu/02.basics/Frequency%20Modulated%20Continuous%20Wave%20Radar.en.html.

"Transponder," Wikipedia, Apr. 5, 2005, pp. 1-4, Retrieved from the Internet: URL: https://en.wikipedia.org/wiki/Transponder.

* cited by examiner

DEVICES, SYSTEMS, AND METHODS FOR RADAR-BASED ARTIFICIAL REALITY TRACKING USING ZERO-CROSSING DETECTION

CROSS REFERENCE TO RELATED APPLICATION

This application claims the benefit of U.S. Provisional Application No. 62/802,458, filed on Feb. 7, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
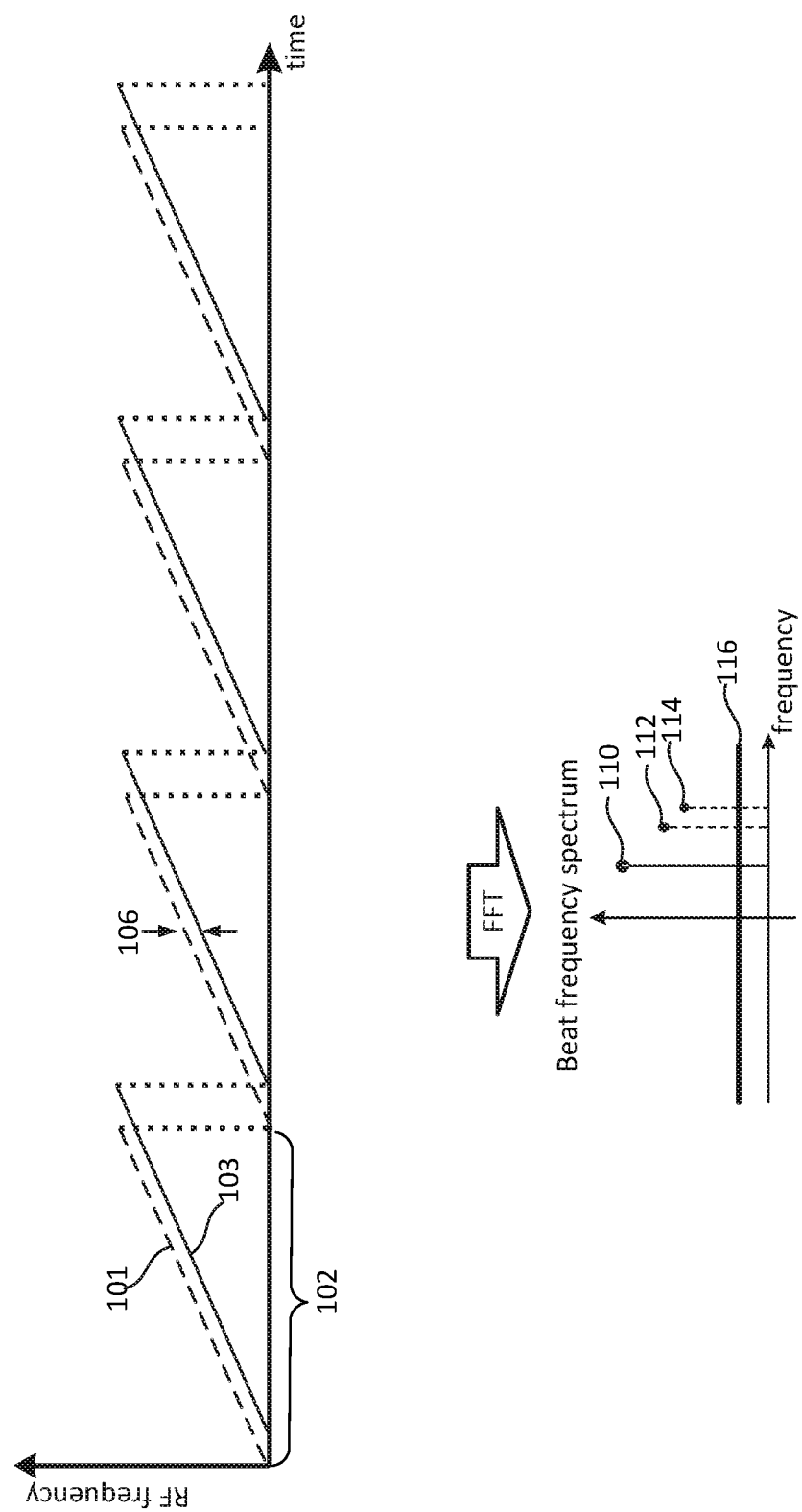
FIG. 1 is an illustration of a radar signal swept over a range of frequencies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial-reality applications, wearable artificial reality devices may also enable users to augment reality and/or combine certain aspects of reality with those of the virtual world.

Despite incredible advances in such technology, traditional artificial reality systems may still have certain deficiencies that negatively impact the overall user experience. For example, some artificial reality systems may struggle to accurately and/or quickly track the position of a user and/or an artificial reality device worn by the user. As such, the artificial reality system may be unable to update virtual content (such as graphics or haptic feedback) with sufficient speed and/or resolution. The present disclosure, therefore, identifies and addresses a need for additional apparatuses, systems, and methods for radar-based artificial reality tracking.

The present disclosure is generally directed to apparatuses, systems, and methods for calculating a distance between a transponder and a radar device by detecting zero-crossings of a beat frequency signal in radar-based artificial reality tracking. As will be explained in greater detail below, these apparatuses, systems, and methods may provide numerous features and benefits.

The disclosed radar systems may utilize various types of radar to track or determine the position, orientation, and/or physical location of a wearable artificial reality device and/or a user of an artificial reality system. In particular, the disclosed systems may utilize frequency-modulated continuous-wave (FMCW) radar. In an FMCW radar system, a radar device may transmit a frequency-modulated signal (e.g., a signal that sweeps between and/or within a certain range of frequencies). In one embodiment, the frequency of an FMCW signal may vary linearly over a fixed period of time. After transmitting an FMCW signal, a radar system may receive a reflected, echoed, and/or otherwise returned signal from a target that received and/or encountered the FMCW signal. The radar system may then determine the range of (e.g., distance to) the target based at least in part on a frequency shift of the returned signal. Specifically, the radar system may combine (e.g., multiply) the returned signal and the original FMCW signal (which may be referred to as a reference signal). The radar system may then identify one or more frequency components of the combined signal. The frequency components may include a difference frequency, and this frequency may be referred to as a beat frequency. In some embodiments, the value of the beat frequency may be directly proportional to the range of the target.

In some examples, a transponder or similar device may return a received FMCW radar signal with a predetermined offset frequency. A mixer may then mix the received signal with a similarly offset transmission frequency. The offset frequency may be larger than a typical beat frequency, allowing the offset frequency to be determined and used to identify the transponder (e.g., to identify the transponder from two or more transponders in a system that utilizes different offset frequencies).

The disclosed radar systems may determine the range of a variety of types of targets. In one example, a radar system may determine the range of passive targets (e.g., targets that simply reflect signals and do not actively transmit signals). Examples of passive targets may include a body part of a user, a wall, and/or a piece of furniture. In other examples, a radar system may determine the range of active targets (e.g., targets that repeat, transmit, and/or modify received signals). Examples of active targets may include repeaters and/or transponders. Examples may be used in various applications, such as augmented reality systems and/or virtual reality systems. However, examples are not limited to such uses. Applications may include control of apparatus (such as electronic devices, data input mechanisms, machinery, vehicles, and the like) using one or more body parts, for example, using hand gestures. Examples also include control of an avatar in a virtual environment.

The radar systems disclosed herein may track and/or determine the position, orientation, and/or physical location of any type or form of wearable artificial reality device, including headsets, head-mounted displays, helmets, neckbands, wristbands, belts, ankle bands, and/or gloves. In some examples, a radar system may include multiple types of wearable artificial reality devices. For example, a radar system may include a headset worn on a user's head and a glove worn on the user's hand. In this example, the radar system may track changes in the relative distance between the headset and portions of the glove. Specifically, a radar device secured to the headset may periodically determine the distance between the radar device and one or more transponders secured to the glove. Additionally or alternatively, the radar system may determine a location of the glove and/or the headset within a physical environment surrounding the user.

The radar systems disclosed herein may utilize information about the position, orientation and/or physical location of a wearable artificial reality device in a variety of ways. For example, a radar system may pass information about a current position of the device (or a change in the position of the device) to an artificial reality system to facilitate modifying one or more virtual components of the artificial reality system. Specifically, based on this information, the artificial reality system may adjust the location at which the user perceives a portion of virtual content (such as a graphic or haptic feedback) to account for the current (e.g., updated) position of the wearable artificial reality device. Additionally or alternatively, the artificial reality system may update a remote view of all or a portion of the user as the user is perceived, via radar, within their physical environment.

As a general example, a wearable radar system may include a wearable artificial reality device and at least one radar device that is secured to the wearable device. This radar device may transmit a frequency-modulated radar signal and then receive at least one signal returned from a target that received the frequency-modulated radar signal. The wearable radar system may also include a processing device that is communicatively coupled to the radar device. This processing device may determine a frequency of the returned signal and then calculate, based at least in part on the frequency, a distance between the target and the radar device. As will be explained in greater detail below, the disclosed radar systems may include any additional or alternative components that facilitate efficiently, precisely, and/or quickly tracking the movement of wearable artificial reality devices.

In one embodiment, a radar system may include (1) a wearable device dimensioned to be worn by a user of an artificial reality system, (2) at least one radar device that (A) is secured to the wearable device and (B) transmits a frequency-modulated radar signal to at least one transponder located within a physical environment surrounding the user, and (3) a processing device that (A) detects a signal returned to the radar device from the transponder in response to the frequency-modulated radar signal and then (B) calculates, based at least in part on a frequency of the returned signal, a distance between the transponder and the radar device.

In some examples, this radar system may include a plurality of radar devices that are secured to the wearable device. In one embodiment, each of these radar devices may be separated by at least a certain distance in three dimensional space. Additionally or alternatively, the radar devices may be distributed in a certain pattern or configuration across and/or along the wearable device. For example, the wearable device may represent a headset that includes a radar device located near each of the user's ears and a radar device located near the top of the user's head. Such a configuration may facilitate three-dimensional localization of a transponder using triangulation techniques. For example, each radar device on the wearable device may transmit the frequency-modulated radar signal to the transponder and receive a returned signal in response. In another example, a single radar device may transmit the frequency-modulated radar signal and each radar device may receive the returned signal. Based on a combined analysis of the returned signals received by each radar device, the processing device may determine a three-dimensional location of the transponder and/or the radar device within the physical environment surrounding the user. In general, the radar devices on a wearable device may be secured in any suitable and/or appropriate pattern, position, and/or configuration.

In one embodiment, the transponder may be secured to an additional wearable device worn on a specific body part of the user. In some examples, a transponder may be located at one or more locations on a glove, e.g., at a fingertip, knuckle, other joint (such as a finger joint, wrist, and the like), palm, back of the hand, and the like. For example, the transponder may be secured to the fingertip of an artificial reality glove worn by the user. In this example, the processing device may determine a current location of the user's fingertip within the physical environment. Additionally or alternatively, the processing device may determine that the user's fingertip has changed location (e.g., relative to the physical environment and/or relative to one or more radar devices).

In another embodiment, the transponder may be secured at a stationary location within the physical environment. For example, the transponder may be part of an array and/or a group of transponders that are positioned at various locations surrounding the user. In this example, the processing device may determine a current position and/or orientation of all or a portion of the user from the perspective of a different user that is viewing the user from a certain distance (e.g., from the stationary location within the physical environment). In one embodiment, determining this position and/or orientation may enable the artificial reality system to provide a remote view of the user to an additional user via a video conferencing or virtual room-sharing application.

In some examples, traditional radar systems may be unable to accurately determine the range of a target when the target is located within a certain distance of a radar device.

For example, an FMCW radar system may have a so-called "blind zone" that corresponds to a region surrounding a radar device in which the frequency change of a returned FMCW signal is too small to easily and/or accurately detect using frequency domain analysis. Traditional processing of FMCW radar signals using a Fast Fourier Transform may result in a frequency spectrum with peaks appearing at frequencies proportional to the distance to the target. The "blind zone" is the region close to DC (e.g., near 0 Hz) where the 1/f noise dominates and overshadows the returned signal from the target. Since the signal to noise ratio of the noise is higher than the target, it may be difficult to determine the distance to the target. In order to reduce and/or eliminate the target distance ambiguity in the blind zone, embodiments of the disclosed radar systems may direct a transponder to intentionally shift the frequency of a returned signal by an amount that a radar system is capable of measuring. The radar system may then account for this frequency shift when calculating the beat frequency. In some examples, a transponder may be configured to return a signal to the radar receiver that has an offset frequency relative to the signal incident at the transponder (which may be the initial transmission frequency of the radar signal.) The offset frequency may allow identification of the transponder, and, in some examples, identification of the body part on which the transponder is located.

Some traditional FMCW radar systems may determine a beat frequency by performing a Fourier transform or similar algorithm in the frequency domain. For example, a conventional technique for calculating a beat frequency may involve mixing a signal returned from a target with a reference signal and then applying a Fast Fourier Transform (FFT) algorithm to the mixed signal. Unfortunately, implementing an FFT algorithm may often be a slow, imprecise, and/or resource-intensive process. For example, it may be necessary and/or helpful to perform a wide frequency sweep in order to calculate a beat frequency via an FFT algorithm. In some examples, even performing a wide frequency sweep may not enable a radar system to discern a particular part and/or orientation of a user with sufficient accuracy. Moreover, analyses performed in the frequency domain may generally involve and/or require greater amounts of computing resources than analyses performed in the time domain.

In many situations where radar is used to determine the range of a target, the delays incurred by performing an FFT may be inconsequential or unnoticeable. For example, a delay of a few milliseconds when determining the range of a large and/or far away object (such as an aircraft) may not disrupt or impede any actions that are to be performed based on the determined range. However, in an artificial reality context, delays incurred by signal processing algorithms may negatively impact a user's experience. For example, such delays may not only be noticeable to a user, but may result in unrealistic or unenjoyable interactions with virtual content.

Accordingly, embodiments of the disclosed radar systems may speed up the calculation of beat frequencies by avoiding FFT algorithms or similar analyses in the frequency domain. In one embodiment, such a radar system may include (1) a wearable device dimensioned to be worn by a user of an artificial reality system, (2) at least one radar device that (A) is secured to the wearable device and (B) transmits a frequency-modulated radar signal to at least one transponder located within a physical environment surrounding the user, and (3) a processing device that (A) detects a signal returned to the radar device from the transponder in response to the frequency-modulated radar signal, (B) determines a beat frequency of the returned signal by performing a zero-crossing analysis of the returned signal in the time domain, and then (C) calculates a distance between the transponder and the radar device.

In some examples, this radar system may determine the beat frequency by mixing the returned signal with a reference signal, detecting at least two successive instances when the amplitude of the mixed signal is zero (i.e., a zero-crossing) or any other pre-determined level (such as a peak or valley), and then determining a length of time between the successive instances. In some examples, the frequency of the reference signal may be offset based on a frequency offset introduced into the returned signal by the transponder. In one embodiment, the radar system may include one or more circuits configured to extract the beat frequency. Specifically, the radar system may include a series of analog processing steps to calculate the range from the frequency shifted return signal. In general, any method of envelope detection of a modulated signal including square-law detection can be applied to extract the beat frequency. Additionally, if the transponder uses a mixing method that adds a transmitted carrier component to its return signal, other synchronous detection techniques may also be employed.

In theory, it may only be necessary to detect two contiguous zero-crossings and measure their time separation in order to determine the frequency of a signal in the time domain. However, in practice, a traditional radar system may be unable to so quickly determine an accurate frequency. For example, based on the size and/or shape of a passive target, one part of the passive target may be farther away from a radar device than other parts of the passive target. As such, radar signals reflected by the passive target may correspond to a range of beat frequencies. As an example, a radar signal reflected by one part of a user's finger may have a different frequency than the same radar signal reflected by a different part of the user's finger. In this example, a beat frequency calculated based on the signals reflected by the finger may appear as a broad peak in the frequency domain, rather than a specific value. In some circumstances, identifying the central value of this peak may involve and/or require analyzing a relatively large data set (e.g., analyzing a greater number of zero-crossings or performing an FFT analysis).

By incorporating active transponders into wearable artificial reality devices, the disclosed radar systems may more quickly and precisely determine beat frequencies. For example, a transponder may appear, to a radar device, as a pinpoint that emits a strong and/or clean signal (e.g., a perfect or near-perfect sinusoid). Such a signal may enable faster and more accurate beat frequency detection (using a zero-crossing analysis) than signals returned by traditional radar systems.

As mentioned above, an FMCW signal may include and/or represent a signal whose frequency sweeps between a certain range (such as from 120 gigahertz to 130 gigahertz). In one embodiment, a traditional FMCW sweep may have a frequency range that corresponds to approximately 10% of the initial frequency. A traditional radar system approach (e.g., a system that extracts beat frequencies based on an FFT algorithm) may analyze data collected over the entirety of such a sweep. The range resolution in conventional FMCW radar schemes may be limited by the bandwidth of the sweep. In contrast, some embodiments of the disclosed radar systems may determine a beat frequency based on data collected during only a small portion of a traditional FMCW sweep. For example, because the disclosed radar systems may require less data to determine a beat frequency, a radar system may utilize FMCW signals within a shorter frequency range (e.g., 120 gigahertz to 121 gigahertz). This shorter sweep may not only reduce the time required to calculate a beat frequency but may also reduce the bandwidth utilized by the radar system. In some examples, the transmission frequency may sweep only over a fraction of the frequency range.

In addition to or instead of decreasing the frequency range of an FMCW sweep, a radar system may increase the speed of an FMCW sweep. For example, while a traditional radar system may perform an FMCW sweep over a period of 10 milliseconds, the disclosed radar systems may be capable of performing the same FMCW sweep over a period of 1 millisecond. This acceleration may be enabled at least in part by the high signal-to-noise ratio of signals returned by transponders (e.g., compared to the relatively noisy and/or weak signals returned by passive targets). The high signal-to-noise ratio of signals returned by transponders may be due to a variety of factors, such as the transponders actively amplifying a radar signal, the transponders shifting the frequency of a returned signal to a range that avoids and/or decreases ambient noise, and/or the transponders returning signals with a certain type of polarization (e.g., a different type of polarization than a received radar signal).

Furthermore, a radar system may reduce the time spent performing an FMCW sweep by stopping the FMCW sweep immediately after a beat frequency is detected and calculated. The radar system may then re-start the FMCW sweep and/or initiate a new FMCW sweep directed to a different transponder. This technique may be referred to as an adaptive zero-crossing observation window. Implementing this adaptive zero-crossing observation window may be especially advantageous when determining the range of a transponder that is located particularly close to a radar device. As an example, such a situation may occur when a user brings their hand to their face while wearing an artificial reality glove and an artificial reality headset. Because the beat frequency corresponding to a target decreases as the range of the target decreases, the time in between each zero-crossing may increase as the range of the target decreases. As such, implementing an adaptive zero-crossing observation window may prevent unnecessary delays when determining beat frequencies, especially when a target is relatively far from the radar device. Targets close to the radar device may have a lower beat frequency and therefore may require a longer observation time (e.g., utilizing a larger fraction of the time duration of the sweep). Targets further away from the radar device may have a higher beat frequency and therefore time spent performing a sweep may be reduced (e.g., a shorter observation time window by stopping the sweep before the full sweep range).

In some examples, a radar system may further optimize the speed and/or precision of determining a beat frequency by comparing a mixed signal (e.g., the combination of a reference FMCW signal and a returned FMCW signal) with one or more models (e.g., templates) representative of various beat frequencies. For example, the radar system may identify a model that most closely fits and/or matches the mixed signal. Specifically, the radar system may utilize a matched filtering technique within an Additive White Gaussian Noise (AWGN) environment. Detecting a beat frequency based on models of various beat frequencies may be performed in addition to or instead of performing a zero-crossing analysis.

In some examples, the disclosed techniques for improving beat frequency detection may enable a radar system to determine the range of a transponder with a resolution that is less than the wavelength of an FMCW signal transmitted by a radar device. For example, embodiments of the disclosed radar systems that operate at millimeter-wave frequencies may determine the location of a transponder (and therefore the position of a wearable artificial reality device and/or a user) with a tolerance of less than a millimeter. In addition, these radar systems may combine any number or group of techniques for improving beat frequency detection in order to further optimize transponder localization.

In some examples, a radar system may include multiple transponders. For example, an artificial reality glove may include a transponder corresponding to each of a user's fingertips, a transponder corresponding to each of the user's knuckles, and additional transponders corresponding to various locations on the user's hands, palms, and/or fingers. Incorporating a large number of transponders into a wearable artificial reality device may increase the resolution with which an artificial reality system is capable of tracking the posture of a user's limbs and detailed movements of the wearable artificial reality device. However, analyzing signals simultaneously and/or continuously returned from a large number of transponders may involve and/or require prohibitively large amounts of time, power and/or computing resources. Moreover, greater numbers of transponders on a wearable artificial reality device may result in greater amounts of dissipated heat, which may be uncomfortable and/or dangerous for the user.

Accordingly, the disclosed radar systems may include one or more features that limit the amount of time one or more individual transponders are active (e.g., transmitting and receiving signals). In addition to reducing the overall and/or instantaneous power consumed by a radar system, these features may facilitate efficiently identifying a particular transponder that returned a signal to the radar system. In one embodiment, such a radar system may include (1) a wearable device dimensioned to be worn by a user of an artificial reality system, (2) at least one radar device that (A) is secured to the wearable device and (B) transmits a frequency-modulated radar signal to a plurality of transponders located within a physical environment surrounding the user, and (3) a processing device that (A) directs at least one of the plurality of transponders to become active fora certain period of time, wherein becoming active enables the transponder to return frequency-shifted signals to the radar device, (B) directs each other transponder within the plurality of transponders to be inactive during the certain period of time, (C) detects, while the transponder is active, a signal returned to the radar device from the transponder in response to the frequency-modulated radar signal, and then (D) calculates, based at least in part on a frequency of the returned signal, a distance between the transponder and the radar device.

In some examples, the processing device may direct the transponder to be active for a time period that is sufficient for the processing device to determine the range of the transponder (e.g., the range of the transponder from one or more receiving antennas). The process of determining the range of a transponder may be referred to as interrogating the transponder. After the processing device interrogates the transponder, the processing device may direct the transponder to become inactive. At this point, the processing device may also direct one or more additional transponders to become active such that the processing device may interrogate the additional transponders. In one example, each transponder within a radar system may automatically cycle through set periods of activity and inactivity. In other examples, the processing device may interrogate various transponders as needed at irregular intervals (e.g., based on past movements of the user). This technique may be combined with the ability of the active transponders to induce a known modulation to their return signal in order to simultaneously detect distances of selected subsets of active transponders activated during the interrogation process.

In some embodiments, a transponder may harvest energy from one or more components of the interrogating system while the transponder is inactive. For example, the transponder may gather, extract, and/or receive energy from nearby electrical devices. In some examples, the transponder may harvest energy from signals transmitted by one or more radar devices, for example, using broad-band receivers that cover the band over which the transmitted frequency may be swept. In some examples, energy may be harvested from one or more other sources, such as electromagnetic radiation at one or more frequencies (e.g. electric power distribution at 60 Hz), wireless transmission frequencies (e.g., the radio frequency used to interrogate the transponder, WiFi, mobile phone, and the like), thermal energy (e.g., using thermocouples, Seebeck effect devices), vibrational energy (e.g., using piezoelectric or flexoelectric devices, or from acoustic energy or user movement), light energy (e.g., using a photoelectric device), from energy harvesting components in a wearable device (e.g., a wearable device on which the transponder is located, for example, using a mechanism to obtain electrical energy from joint flexure or other body movement), or any other energy source or combination thereof. The transponder may then store and/or accumulate this energy (e.g., via a capacitor or other charge-storage device).

Once the processing device directs the transponder to become active, the transponder may send a returned signal using the harvested energy. In some examples, the transponder may be powered by a portion of the received interrogating or radar signal energy while returning a radar signal. In some examples, the radar apparatus may have a mode in which energy is transmitted to the transponders (e.g., a temporary mode between frequency sweeps). In some examples, a radar device may have a transmitter dedicated to transmitting energy to transponders. In this way, the transponder may not necessarily be wired to and/or powered by a power supply (such as a battery, an Alternating Current (AC) power supply, or a Direct Current (DC) power supply). In some embodiments, the processing device may direct the transponder to be active for a short enough time interval such that the energy harvested by the transponder is sufficient to power the transponder for the entirety of the active time interval. In some examples, a transponder may be powered from a local power source (e.g., a battery or other charge storage device within a wearable component such as a glove) through an electrical connection, by wireless coupling, and/or in any other suitable manner.

A radar device and/or a transponder may include a transmitting antenna that transmits radar signals and a receiving antenna that receives returned radar signals. If these antennas are located within a certain distance of each other, the antennas may become mutually coupled (e.g., internally coupled). This coupling may introduce undesirable noise (e.g., ringing) into both the transmitted and received signals. Some traditional radar systems may attempt to mitigate this problem by limiting or reducing the strength of transmitted signals. While this method may effectively reduce mutual internal coupling, it may also reduce the amount of available radiated power and/or the accuracy and overall performance of the radar systems. Additionally or alternatively, traditional radar systems may reduce mutual internal coupling by positioning the transmitting and receiving antennas at least a certain distance (e.g., several centimeters) away from each other. However, the disclosed radar systems may implement relatively small transponders whose transmitting and receiving antennas are located close to each other (e.g., within a fraction of a millimeter). Utilizing such small transponders may provide a number of benefits (such as ensuring that the transponders appear point-like and increasing the number of trackable points that may be incorporated into a single wearable artificial reality device). However, these radar devices may not be compatible with traditional methods for reducing mutual coupling.

In addition, while mutual internal coupling between the transmitting and receiving antennas of a device may negatively impact the performance of a radar system, the radar system may depend on and/or benefit from strong mutual coupling between the transmitting antenna of one device and the receiving antenna of another device. Unfortunately, many traditional radar systems may be unable to consistently ensure such coupling. For example, in a traditional radar system, a received signal may be degraded (or even lost) if the receiving antenna is turned at more than a certain angle relative to the transmitting antenna.

Accordingly, embodiments of the disclosed radar systems may incorporate one or more features to reduce mutual internal coupling within a device and/or increase mutual coupling between a radar device and a transponder. In one embodiment, such a radar system may include (1) a wearable device dimensioned to be worn by a user of an artificial reality system, (2) at least one radar device that (A) is secured to the wearable device (B) transmits, to at least one transponder located within a physical environment surrounding the user, a frequency-modulated radar signal that has a first type of polarization, and (C) receives signals that have a second type of polarization, the second type of polarization being different than the first type of polarization, and (3) a processing device that (A) detects a signal that has the second type of polarization and was returned to the radar device from the transponder in response to the frequency-modulated radar signal and then (B) calculates, based at least in part on a frequency of the returned signal, a distance between the transponder and the radar device.

In some examples, the radar system may implement an orthogonal polarization strategy. In this strategy, the radar device and/or the transponder may include a transmitting antenna that radiates signals that have a certain type of linear polarization (e.g., horizontal or vertical polarization) or a certain type of circular polarization (e.g., clockwise or anti-clockwise polarization). The radar device and/or the transponder may also include a receiving antenna that receives signals whose polarization is different from the polarization of the transmitted signals. For example, the radar device and/or the transponder may transmit signals with linear horizontal polarization and receive signals with linear vertical polarization.

Incorporating orthogonally polarized receiving and transmitting antennas on the radar device and/or the transponder may eliminate and/or reduce mutual coupling between each pair of antennas. As such, the strength of the transmitted and returned signals may be amplified. For example, because residual mutual coupling increases as signal strength increases, minimizing mutual coupling may enable the transponder to increase the gain of the returned signal. In some examples, a signal-to-noise ratio may be increased by detecting a returned signal with an orthogonal polarization to the transmitted signal.

Additionally or alternatively, the radar system may implement a linear-circular polarization strategy. In this strategy, each device may transmit and receive signals with different types of polarization (i.e., either circular or linear polarization). For example, the radar device may transmit and receive circular polarization while the transponder receives and transmits linear polarization (or vice versa). In one embodiment, a linear-circular polarization strategy may also include implementing orthogonally polarized receiving and transmitting antennas at the radar device and/or the transponder. As an example, the radar device may transmit clockwise circular polarization and receive anti-clockwise circular polarization, while the transponder receives horizontal linear polarization and transmits vertical linear polarization. The linear-circular polarization strategy allows for minimization of mutual coupling between the antennas of the transponder and the antennas of the radar unit, while simultaneously allowing the transponders and radar units to have arbitrary relative orientation in space.

In some examples, a linear-circular polarization strategy may reduce signal loss due to certain movements of the user. For example, if the radar device transmits only signals with linear polarization and the transponder receives only signals with linear polarization, the transponder may be unable to detect signals from the radar device if the user moves such that the radar device is turned or at a certain angle relative to the transponder. However, because a circularly polarized signal is formed by transmitting two perpendicularly polarized waves with a 90° phase offset, a receiver configured to receive linear polarization may detect at least a portion of a circularly polarized signal regardless of the orientation between the receiver and the transmitter.

In addition, both the orthogonal polarization strategy and the linear-circular polarization strategy may be used (e.g., passive targets within the surrounding physical environment). For example, noise may be introduced into a traditional radar system when a transmitted or returned radar signal is reflected by one or more pieces of clutter. Because passive targets may not change the polarization of a radar signal, the disclosed radar systems may be immune (e.g., "blind") to clutter-induced noise.

However, in some examples, it may be advantageous and/or desirable to determine the range of one or more passive targets surrounding the user. For example, the radar system may simultaneously track the movement of a wearable artificial reality device that includes the transponder and track the distance between the user and a nearby wall or piece of furniture that does not include a transponder. To accomplish this task, the radar device may include a receiving antenna that is configured to detect signals returned from the transponder that have changed polarization and at least one additional receiving antenna that is configured to detect signals reflected by passive targets that exhibit a different polarization of the transmitted radar signal. In some examples, the clutter may be at a different distance to the radar device than the transponders thereby inducing a different frequency shift than the active transponders. Analysis of the returned signals in the frequency domain may allow separation of the transponder returned signals from the clutter returned signals.

The disclosed radar devices and transponders may include any type or number of circuits, devices, antennas, and/or other components that produce a desired type of polarization. For example, a transponder may be specially designed to mount and/or secure an antenna that changes a linearly polarized radar signal to a circularly polarized signal and/or an antenna that changes a horizontally polarized radar signal to a vertically polarized signal.

As mentioned above, a radar system may include multiple transponders. Some embodiments of the disclosed radar systems may identify a particular transponder that returned a particular radar signal based at least in part on a frequency shift intentionally introduced into the returned signal by the particular transponder. In one embodiment, such a radar system may include (1) a wearable device dimensioned to be worn by a user of an artificial reality system, (2) at least one radar device that (A) is secured to the wearable device and (B) transmits a frequency-modulated radar signal to a plurality of transponders located within a physical environment surrounding the user, and (3) a processing device that (A) detects a signal returned to the radar device from one of the transponders within the plurality of transponders in response to the frequency-modulated radar signal, (B) determines which transponder within the plurality of transponders returned the signal by (i) determining that a frequency of the returned signal has been shifted by a certain amount and (ii) identifying a particular transponder within the plurality of transponders that is configured to shift frequencies of returned signals by the certain amount, and then (C) calculates, based at least in part on the frequency of the returned signal, a distance between the particular transponder and the radar device.

In some examples, each transponder interrogated by the radar system may be configured to shift the frequency of signals returned to the radar system by a different amount. For example, a first transponder may shift the frequency of a returned signal by 1 megahertz and another transponder may shift the frequency of a returned signal by 2 megahertz. Accordingly, the carrier frequency (e.g., base frequency) of signals returned by the first transponder may be 1 megahertz lower than the carrier frequency of signals returned by the second transponder. In some embodiments, each transponder interrogated by the radar system may return signals with a different carrier frequency. A transponder may shift the frequency of a returned signal in a variety of ways, such as by implementing a circuit and/or an oscillator configured to shift the frequency of FMCW signals received from a radar device by a pre-determined amount before returning the FMCW signals to the radar device. Specifically, a transponder may include a clock that provides a clock signal. The returned signal may have an offset frequency that may be related to the clock signal frequency. In some examples, mixing the received radar signal with the clock signal may produce an amplitude modulated signal. For example, the received radar signal may be mixed with a clock signal and an amplitude modulated signal resulting from mixing the received radar signal and the clock signal may be returned to the radar device. The offset frequency may be equal to the frequency of the clock signal that is mixed with the received radar signal. A transponder may be configured to return a signal with an offset frequency relative to a radar signal incident on the transponder. In some examples, the offset frequency may be controllable (e.g., by the radar apparatus, other remote devices, or by settings on the transponder or wearable device on which it is located). In some examples, an offset frequency may be used to identify a user (e.g., a specific person, such as a particular player within a game). In some examples, an offset frequency may be used to identify a used to identify a certain transponder within a group of transponders (e.g., distinguishing a transponder return signal from a transducer worn on a user's elbow from a transponder return signal from a transducer worn on the user's wrist).

In some examples, the radar system may receive signals returned from multiple transponders within a single communication channel. The radar system may then perform any type or form of signal processing algorithm to identify and/or separate the signals (e.g., based on their various carrier frequencies). However, in other examples, the radar system may include, for each transponder, a separate communication channel associated with the transponder. In one embodiment, a communication channel associated with a particular transponder may include a filter circuit containing an oscillator tuned to the carrier frequency of the particular transponder, a mixer, and a bandpass filter. This filter circuit may receive signals from the particular transponder while filtering out and/or attenuating signals from all or a portion of the other transponders. The filter circuit may then pass the signals from the particular transponder to the processing device such that the processing device may determine the range of the particular transponder.

In some examples, implementing separate communication channels for individual transponders may also eliminate and/or reduce noise generated by clutter within the physical environment. For example, because a passive target does not intentionally shift the frequency of a returned signal by a set amount, the communication channels of the radar system may filter out signals that were reflected by passive targets by filtering signals whose frequencies have not been shifted by a certain amount.

In some examples, a system may provide multiple viewpoints (e.g., for augmented reality or virtual reality applications). For example, a radar apparatus may be located on a body part of a user (e.g., the head, torso, or elsewhere), to provide a point of view for that user. Radar apparatus may also be located at different locations, e.g., to provide an outside view of a user (e.g., a player in a virtual game).

Figure 7:
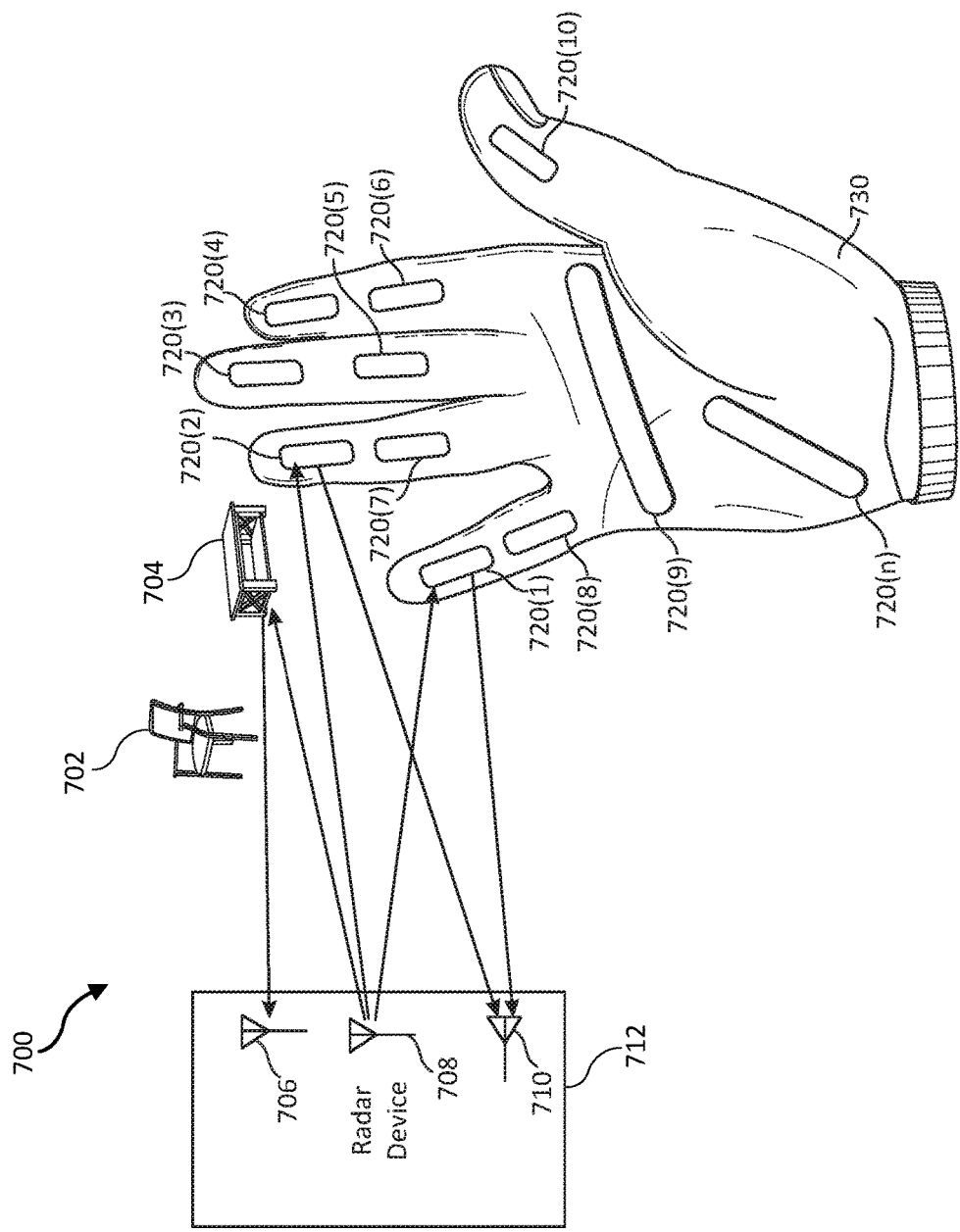
FIG. 7 is an illustration of exemplary radar devices and radar transponders that may be used in connection with embodiments of this disclosure.
Figure 8:
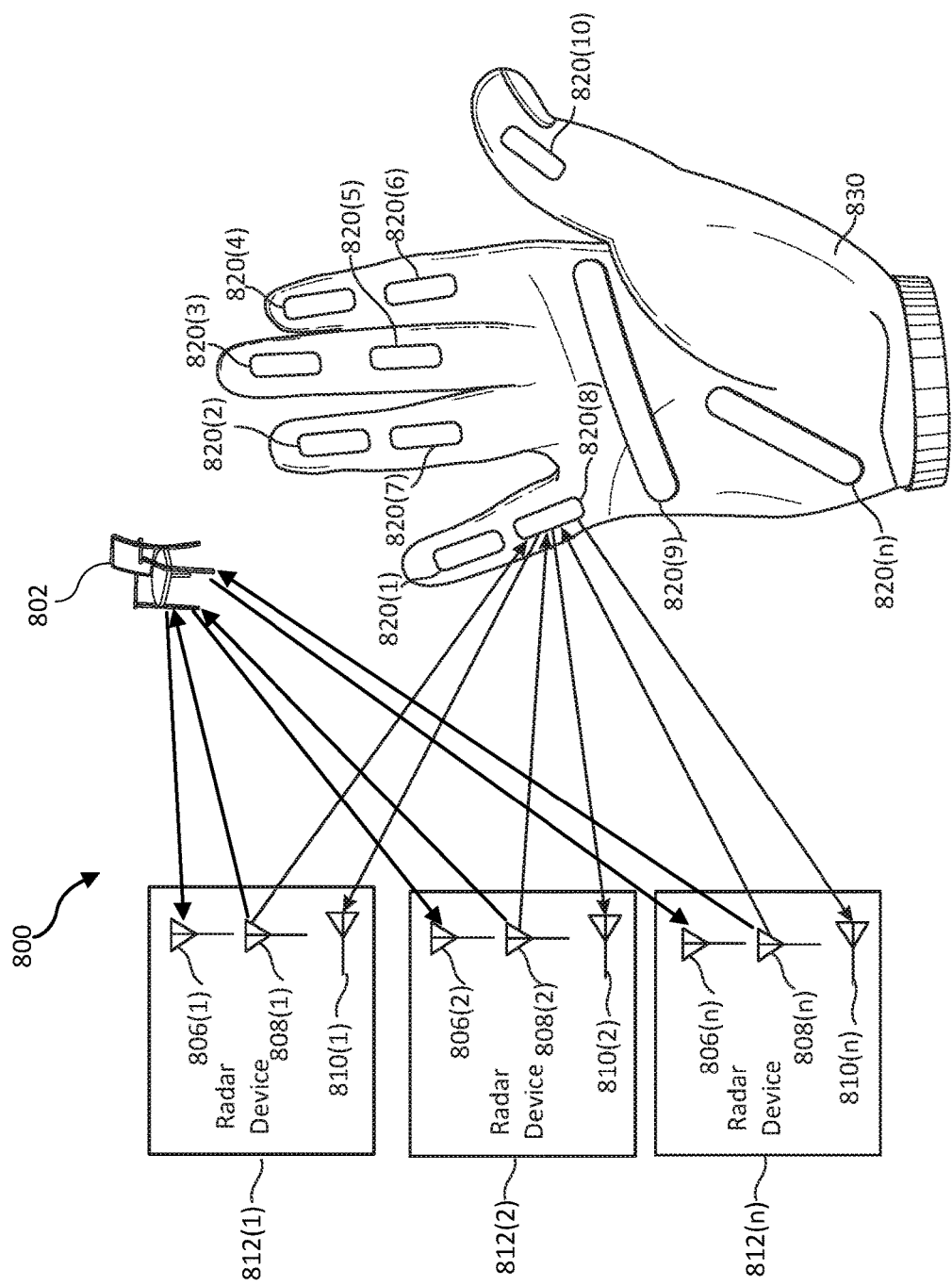
FIG. 8 is another illustration of exemplary radar devices and radar transponders that may be used in connection with embodiments of this disclosure.
Figure 9:
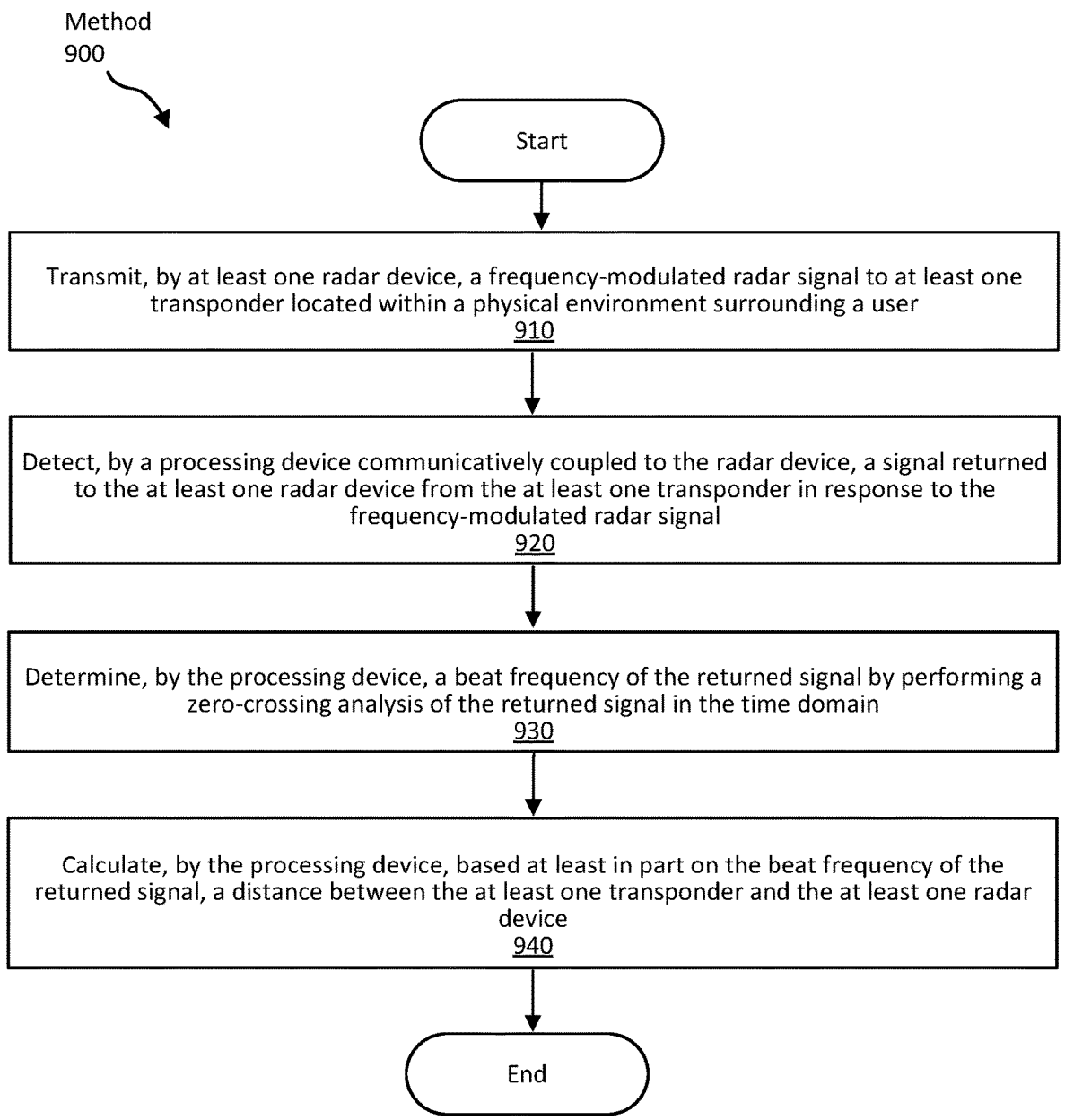
FIG. 9 illustrates a flowchart of an example method of calculating a distance between a transponder and a radar device by detecting zero-crossings of a beat frequency signal.

The following will provide, with reference to FIG. 1, detailed descriptions of FFT processing of a reflected signal in an FMCW radar system. FIGS. 2-6 will provide detailed descriptions of methods and circuits for calculating a distance between a transponder and a radar device by determining a beat frequency of a signal returned by the transponder through a zero-crossing analysis of the returned signal. FIGS. 7-8 will provide detailed descriptions of radar devices and radar transponders for augmented reality and/or virtual reality applications. FIG. 9 is a flowchart of a method of calculating a distance between a transponder and a radar device by detecting zero-crossings of a beat frequency signal. FIGS. 10-15 will provide detailed descriptions of exemplary augmented or virtual reality devices that may be used in connection with embodiments of this disclosure.

FIG. 1 is an illustration of a radar signal sweeping over a range of frequencies and a frequency spectrum of a received radar signal. The graph of FIG. 1 is a frequency-time domain representation of transmitted radar signal 101 and received radar signal 103. Transmitted radar signal 101 may be a Frequency Modulated Continuous Waveform (FMCW) in which the frequency of transmitted radar signal 101 is swept (e.g., increased) over time. Transmitted radar signal 101 may be swept over time period 102. Transmitted radar signal 101 may be reflected by objects (e.g., targets) in the path of the transmitted signal. The targets may reflect transmitted radar signal 101 and the reflected signal may be received by a radar receiver. Reflected radar signal 103 may be a signal reflected by a target. Reflected radar signal 103 may be processed by the radar receiver in order to determine a distance (e.g., range) from the radar transmitter to the target. Reflected radar signal 103 may be processed using any suitable method. In some examples, reflected radar signal 103 may be mixed with transmitted radar signal 101 to produce a signal having a beat frequency. Beat frequency 106 may be the difference between the frequency of transmitted radar signal 101 and the frequency of reflected radar signal 103. The frequency difference between the received signal and the transmitted signal may increase with delay, and therefore with distance. The distance (e.g., range) from the radar transmitter to the target may be proportional to beat frequency 106. Further, the received signal may represent reflected signals from multiple targets.

Beat frequency 106 may be determined using any suitable method. For example, the mixed signal (reflected radar signal 103 mixed with transmitted radar signal 101) may be processed by a Fast Fourier Transform (FFT) to generate a frequency distribution of the mixed signal above noise level 116. The FFT processing may result in a frequency distribution that has separate peaks in which each peak may denote the presence of a target that reflected transmitted radar signal 101 at a specific distance. For example, peak 110 may represent beat frequency 106 associated with reflected radar signal 103. Peaks 112 and 114 may represent beat frequencies associated with reflected radar signals from targets located a greater distance from the radar transmitter than the target reflecting radar signal 103. Although peaks 110, 112, and 114 appear in FIG. 1 as points within the frequency spectrum, in some examples, peaks 110, 112, and 114 may have a frequency bandwidth. As described above, implementing an FFT algorithm may often be a slow, imprecise, and/or resource-intensive process. For example, it may be necessary and/or helpful to perform a wide frequency sweep corresponding to time period 102 in order to calculate beat frequency 106 via an FFT algorithm. In some examples, even performing a wide frequency sweep may not enable a radar system to discern a particular target with sufficient accuracy. Moreover, analyses performed in the frequency domain may generally involve and/or require greater amounts of computing resources than analyses performed in the time domain (as described in detail below with respect to FIGS. 2-8). In some examples, a radar system may perform the analysis in the time domain by detecting a signal returned to the radar device from a transponder, determine a beat frequency of the returned signal by performing a zero-crossing analysis of the returned signal, and calculate, based on the beat frequency of the returned signal, a distance between the transponder and the radar device.

Figure 2:
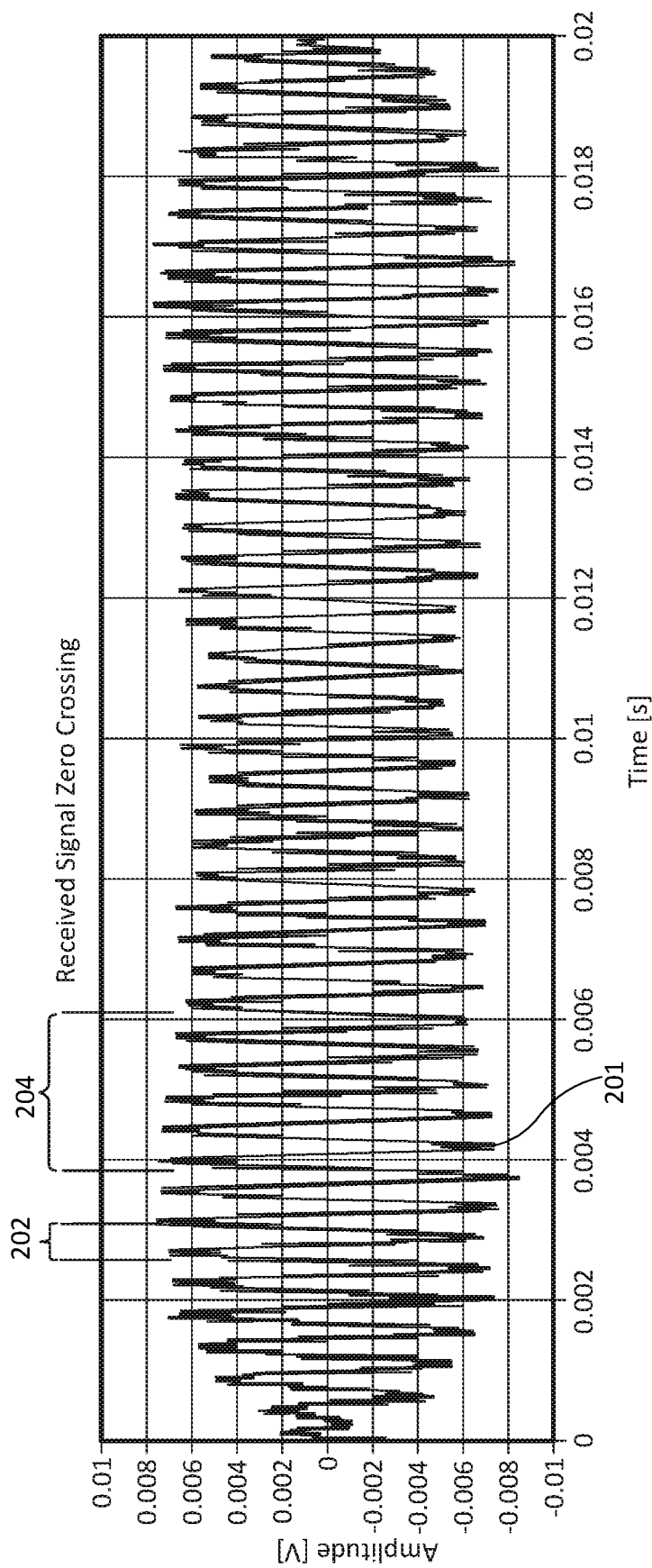
FIG. 2 illustrates a beat frequency signal in the time domain.

FIG. 2 illustrates a beat frequency signal in the time domain. The graph shown in FIG. 2 represents the amplitude (e.g., volts) of beat frequency signal 201 over time (e.g., seconds). Beat frequency signal 201 may be generated as described below with respect to FIGS. 3-5. The time period of a single cycle of beat frequency signal 201 may be represented by time period 202. In some examples, time period 202 may be determined by measuring the time between zero crossings (e.g., the time at which the amplitude of the signal is zero) of beat frequency signal 201. Time period 202 may be measured using any suitable method. Time period 202 may be measured using the zero-crossing methods described below with respect to FIGS. 3-6. In some examples, the resolution of the frequency determination may be increased by measuring multiple zero crossings such as time period 204. In some examples, a radar system may determine a beat frequency of a radar signal returned from a transponder by performing a zero-crossing analysis of the returned signal in the time domain, and calculate, based on the beat frequency of the returned signal, a distance between the transponder and the radar device. Calculating a beat frequency based on zero-crossing measurement may include benefits such as faster range determination of targets as compared to methods such as methods using FFT, higher resolution and accuracy of range determination, and reduced power consumption of radar transmitters, receivers and processors.

Figure 3:
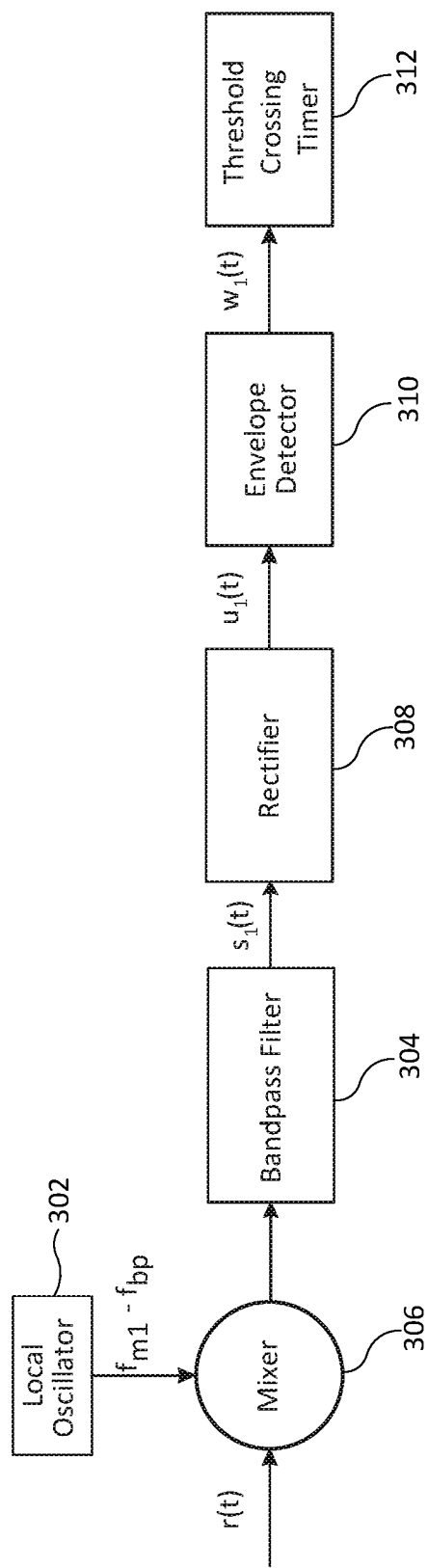
FIG. 3 is a block diagram of an example circuit for detecting zero-crossing of a beat frequency signal in the time domain.
Figure 4:
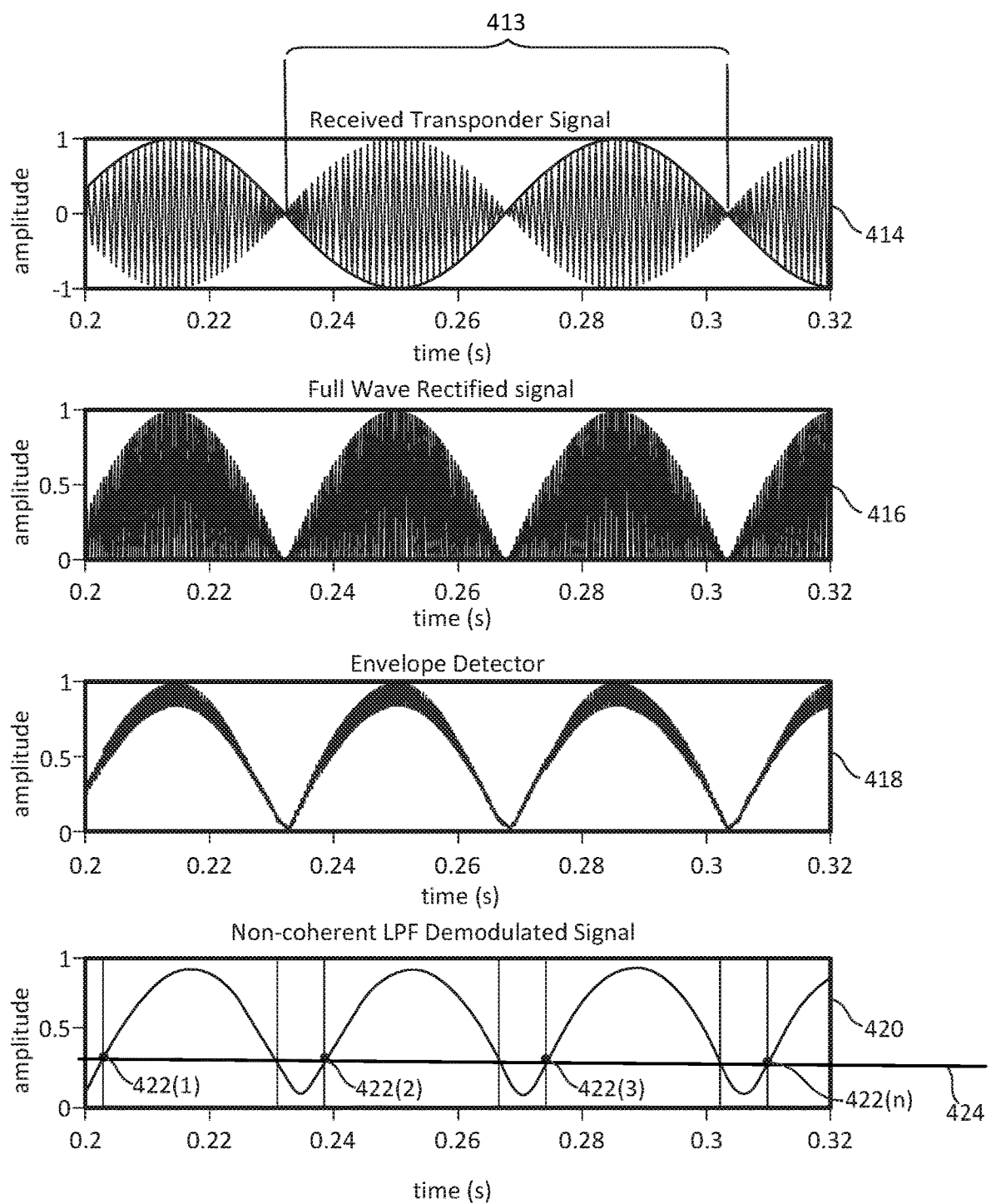
FIG. 4 illustrates waveforms associated with a circuit for detecting zero-crossing of a beat frequency signal in the time domain.

FIG. 3 is a block diagram of an example circuit for detecting zero-crossing of a beat frequency signal in the time domain. FIG. 4 illustrates waveforms associated with a circuit for detecting zero-crossing of a beat frequency signal in the time domain. As described above with respect to FIG. 2 calculating a distance between a transponder and a radar device based on the beat frequency of a signal returned from the transponder may include determining the beat frequency by performing a zero-crossing analysis of the returned signal in the time domain. Determining the beat frequency by performing a zero-crossing analysis of the returned signal in the time domain may be performed using any suitable method. Determining the beat frequency of the returned signal may include measuring at least one time period between cycles of the returned signal. In some examples, measuring at least one time period between cycles of the returned signal may include measuring time periods using the circuit of FIG. 3. As shown in FIG. 3, beat signal r(t) may be mixed with a reference signal from local oscillator 302 in mixer 306. The frequency of the signal from local oscillator 302 may correspond to a frequency of a signal received from the transponder.

In some examples, the frequency of the reference signal may be offset based on a frequency offset introduced into the returned signal by the transponder. The local oscillator may provide signals of multiple frequencies in which each of the multiple frequencies corresponds to a transponder in a set of transponders. Local oscillator 302 may switch between each of the multiple frequencies in order to select the beat frequency corresponding to each of the transponders in the set of transponders. The resulting mixed signal from mixer 306 may be processed by bandpass filter 304 and produce signal $S_1(t)$ which may be a high frequency signal with an envelope, where the frequency of the envelope corresponds to the beat frequency of the returned signal from a transponder. FIG. 4 is a set of signal waveforms corresponding to the signals produced by the block diagram of FIG. 3. As shown in FIG. 4, the resulting filtered signal $S_1(t)$ from bandpass filter 304 may be represented in the time domain as the signal shown in waveform 414 in which time period 413 may be the period of the beat signal that is proportional to the distance from the radar receiver to the transponder. Rectifier 308 may rectify signal $S_1(t)$ from mixer 306 using any suitable method. Rectifier 308 may be a full-wave rectifier that converts the whole of input signal $S_1(t)$ to one of constant positive polarity (e.g., absolute value) at its output thereby producing signal $U_1(t)$. Rectifier 308 may rectify signal $S_1(t)$ using the baseband processing circuit of FIG. 5. As shown in FIG. 4, the resulting rectified signal $U_1(t)$ from rectifier 308 may be represented in the time domain as the signal shown in waveform 416 in which all components of the signal have a positive amplitude.

Rectified signal $U_1(t)$ from rectifier 308 may be provided to envelope detector 310 to produce signal $w_1(t)$ that is the envelope of rectified signal $U_1(t)$. Envelope detector 310 may demodulate rectified signal $U_1(t)$ by removing high frequency components of the signal. The envelope of rectified signal $U_1(t)$ may be an outline of the signal that effectively connects all the peaks in the signal. As shown in FIG. 4, the resulting signal $W_1(t)$ from envelope detector 310 may be represented in the time domain as the signal shown in waveform 418 in which the signal is an outline of rectified signal $U_1(t)$.

Determining a time period of a beat frequency by measuring zero crossings of the returned signal may be accomplished using any suitable method. Determining a time period of a beat frequency may be similarly accomplished by measuring the time period of the beat frequency signal after the signal has been filtered, rectified and envelope detected as described above, by measuring the time period of signal $W_1(t)$ from envelope detector 310. Measuring the time period of signal $W_1(t)$ may be accomplished using any suitable method. In some examples, measuring a time period of successive non-zero amplitude threshold crossings may determine the period of the signal. Threshold crossing timer 312 may be a digital timing circuit and may measure a time period of successive zero or non-zero amplitude threshold crossings. As shown in waveform 420 of FIG. 4, amplitude threshold 424 may be set. Threshold crossing timer 312 may determine when the signal has an increasing amplitude and crosses amplitude threshold 424 from an amplitude below amplitude threshold 424 to an amplitude above amplitude threshold 424. The points at which the signal crosses amplitude threshold 424 may be indicated by threshold crossing points 422(1) to 422(n). In some examples, a time period of a beat frequency may be determined by measuring the time period between two successive threshold crossing points (e.g., time from threshold crossing point 422(1) to 422(2)). In some examples, a resolution and accuracy of the time period may be increased by measuring multiple successive threshold crossing points (e.g., time from threshold crossing point 422(1) to 422(n) and dividing the time period from 422(1) to 422(n) by n (the number of time periods). Measuring multiple successive threshold crossing points may be accomplished using the circuit described below with respect to FIG. 5. Calculating a beat frequency based on measuring multiple successive threshold crossing points in order to determine a range of a transponder target may include benefits such as reduced and/or variable sweep times as compared to other FMCW radar methods, faster range determination of transponder targets as compared to methods using FFT, successive determination of multiple transponder target ranges located in proximity to one another, higher resolution and accuracy of range determination of transponder targets, and reduced power consumption of radar transmitters, receivers and processors.

Figure 5:
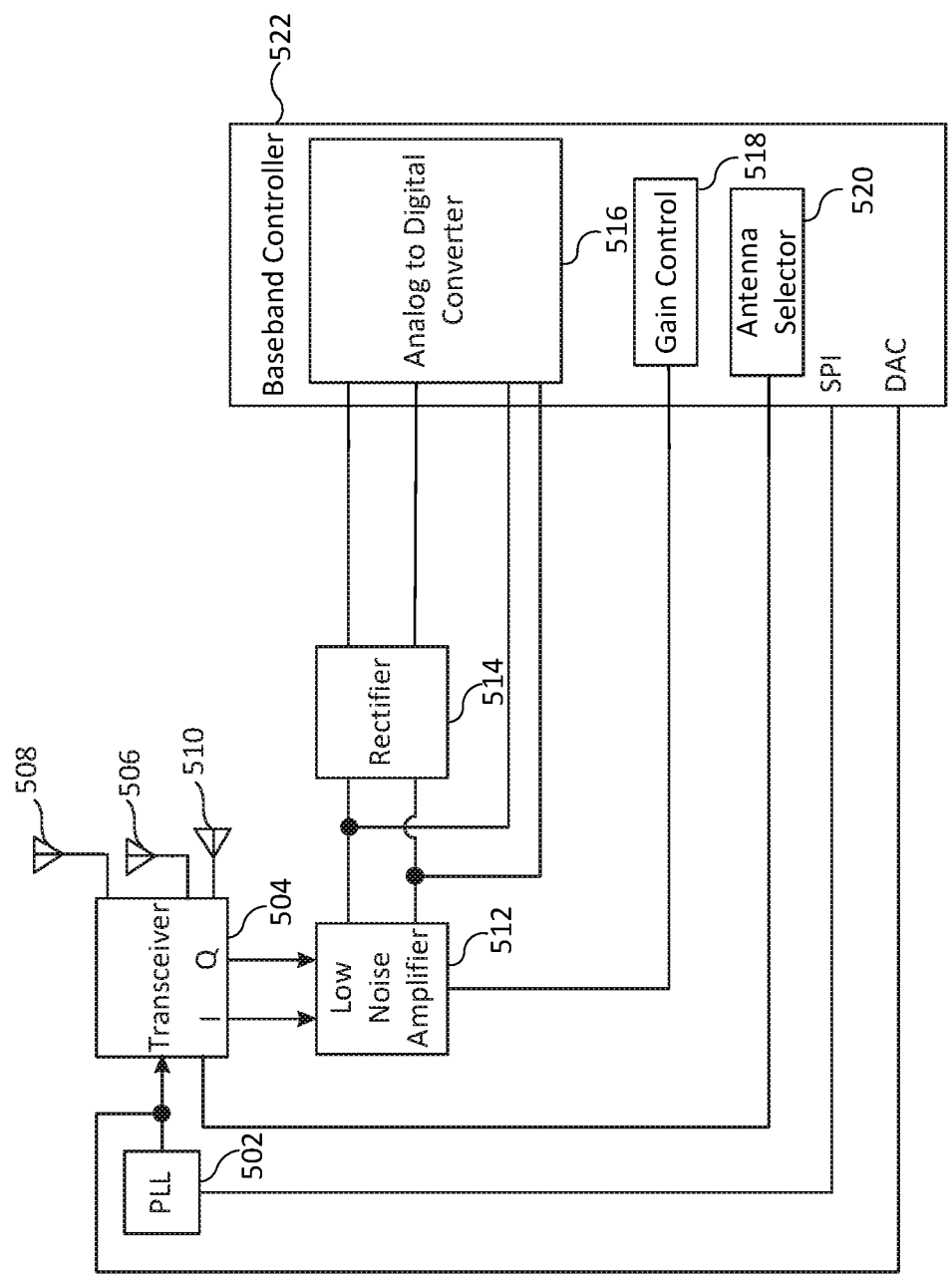
FIG. 5 is a block diagram of an example circuit for measuring a time period of a beat frequency signal.

FIG. 5 is a block diagram of a circuit for measuring a time period of a beat frequency signal. As described above with respect to FIGS. 3 and 4, the range (e.g., distance) of a target may be determined by measuring a time period of a beat frequency signal associated with a radar signal returned from the target. In some examples measuring a time period of a beat frequency signal associated with a radar signal returned from the target may be accomplished using the circuit of FIG. 5. Referring to FIG. 5, transmit antenna 506 may transmit a sweeping (e.g., increasing frequency) FMCW radar signal produced by transceiver 504. Transmit antenna 506 may sweep the radar signal for variable periods of time as will be described below with respect to FIG. 6. The swept radar signal transmitted from transmit antenna 506 may be reflected by a target (e.g., transponder) and received by receive antenna 508 and/or receive antenna 510. In some examples, the swept radar signal transmitted from transmit antenna 506 may be reflected by a target (e.g., transponder) and received by receive antenna 510 with a polarization orthogonal to the polarization of the transmitted signal. Transceiver 504 may receive the reflected signal and/or the reflected orthogonal signal and provide I and Q components of the reflected signal and/or the reflected orthogonal signal to low noise amplifier 512. Antenna selector 520 may select which signals from antennas 506, 508, or 510 is provided to low noise amplifier 512. The amplitude of the reflected signal and/or the reflected orthogonal signal may be amplified by low noise amplifier 512. The gain of low noise amplifier 512 may be controlled by gain control 518 of baseband controller 522. Transceiver 504 may receive a phase locked variable frequency periodic signal from phase lock loop (PLL) 502. The phase locked variable frequency periodic signal from PLL 502 may be used by transceiver 504 to modulate a transmitted radar signal or demodulate a received (e.g., reflected) radar signal. The frequency of the phase locked variable frequency periodic signal from PLL 502 may be controlled by transceiver 504 through a Serial Peripheral Interface (SPI).

In some examples, the amplified signal from low noise amplifier 512 may be rectified by rectifier 514. The amplified signal from low noise amplifier 512 may be rectified in accordance with the method described above with respect to rectifier 308 and rectified signal waveform 416. Rectifier 514 may be a full wave rectifier and may include a diode bridge rectifier circuit. Analog-to-digital converter 516 may receive both the amplified signal from low noise amplifier 512 that alternates between positive and negative amplitudes and the full wave rectified signal that includes only the positive amplitudes. Analog-to-digital converter 516 may convert the received non-rectified and/or rectified signals into the digital domain for digital signal processing. Baseband processor 522 may include a processor (e.g., microprocessor, digital signal processor, etc.) and instructions stored in memory that, when executed by the processor, processes the received non-rectified and/or rectified signals to determine a time period corresponding to the beat frequency of the signals received by receive antenna 508 and/or receive antenna 510. Baseband processor 522 may calculate a beat frequency based on measuring multiple successive threshold crossing points in order to determine a range of a transponder target.

Figure 6:
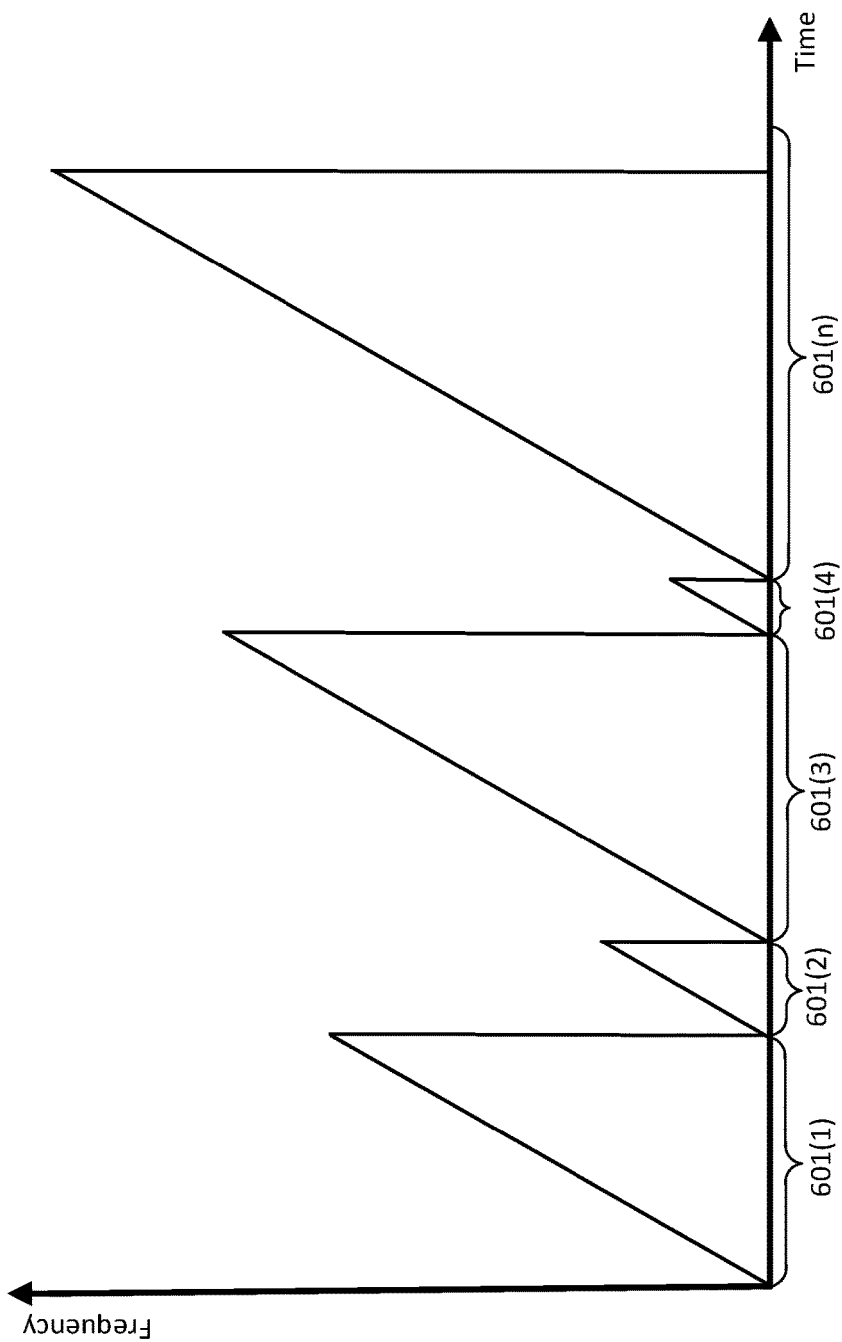
FIG. 6 illustrates an FMCW radar signal sweep over variable time periods.

FIG. 6 illustrates an FMCW radar signal sweep over variable time periods. As described above with respect to FIGS. 1-5 an FMCW radar system may transmit a signal that is swept over time having a varying frequency (e.g., increasing over time). As shown in FIG. 6 the transmitted radar signal may be swept from an initial frequency to a final frequency over time. The radar signal may increase at a linear rate (e.g., constant rate of increase over time) or a non-linear rate. Sweep time periods 601(1) to 601(n) may represent the time periods over which the transmitted radar signal is swept. Although the graph of FIG. 6 shows the frequency of the radar signal increasing at a linear rate, the present disclosure is not limited to such. Additionally or alternatively, the signal may be transmitted over any frequency range. For example, the transmitted signal may be transmitted in the range of 120 gigahertz to 130 gigahertz. At the beginning of sweep time periods 601(1) to 601(n) the radar signal may be transmitted at an initial frequency that may be the same initial frequency for each of sweep time periods 601(1) to 601(n). The frequency may sweep over time (e.g., linear increase) until a final frequency is transmitted. Sweep time periods 601(1) to 601(n) may be any range of time. For example, sweep time periods 601(1) to 601(n) may be in the range of over 10 ms, between 10 ms and 1 ms, or less than 1 ms. Sweep time periods 601(1) to 601(n) may correspond to any frequency range (e.g., 120 gigahertz to 121 gigahertz).

In some examples, the beat frequency may be proportional to the range of the target transducer. A target transducer that is closer to the radar device may have a lower beat frequency (and therefore a longer time period between successive zero crossings) than a target that is farther away which may have a higher beat frequency (and therefore a shorter time period between successive zero crossings). Determining a beat frequency by measuring successive zero crossings as described above may require processing the signal over varying periods of time depending on the distance of the target transducer to the radar device. In an embodiment of the present disclosure, the time period over which the transmitted signal is swept may be based on a time period until a measurement of successive zero crossings of the returned signal is made. The time period over which the transmitted signal is swept may correspond to an adaptive zero-crossing observation window. After the measurement of successive zero crossings of the returned signal from a target transducer is complete, the radar device may reset the transmitter to the initial frequency and begin sweeping again until a measurement of successive zero crossings of the returned signal from another target transducer is made. For example, sweep time periods 601(1), 601(3), and 601(n) made be associated with measurements of successive zero crossings of target transducers that are closer to the radar device than sweep time periods 601(2) and 601(4) that may be associated with measurements of successive zero crossings of targets that are farther away from the radar device.

The methods associated with variable sweep time and adaptive zero-crossing observation window may include multiple advantages including, without limitation, reduced and/or variable sweep times as compared to other FMCW radar methods, faster range determination of targets as compared to methods such as FFT, successive determination of ranges of multiple targets located in proximity to one another, higher resolution and accuracy of range determination of targets, and reduced power consumption of radar transmitters, receivers and processors.

FIG. 7 is an illustration of exemplary radar devices and radar transponders that may be used in connection with embodiments of this disclosure. As described below with respect to FIG. 13, haptic feedback may be provided to a user by interfaces positioned within a user's environment (e.g., chairs, tables, floors, etc.) and/or interfaces on articles that may be worn or carried by a user (e.g., gloves, wristbands, etc.). Similarly, radar transponders may be positioned on articles that may be worn or carried by a user. The radar transducers may be used in a radar system to determine the location of the transducers relative to a radar device. As an example, FIG. 7 illustrates a radar system 700 in the form of a wearable device 730 and radar device 712. Wearable device 730 is shown as an example and may be in the form of a glove that includes a flexible, wearable textile material that is shaped and configured for positioning against a user's hand. This disclosure also includes radar systems that may be shaped and configured for positioning against other human body parts including, without limitation, a finger, an arm, a head, a torso, a foot, or a leg. By way of example and not limitation, radar systems according to various embodiments of the present disclosure may also be in the form of a headband, an armband, a sleeve, a head covering, a sock, a shirt, or pants, among other possibilities. One or more radar transponders may be positioned within wearable device 730. Radar transponders 720(1) to 720(n) may be positioned in locations to provide a relative location of the transponder to radar device 712. For example, radar transponders 720(1) to 720(n) may be positioned to be against the user's finger(s), thumb, or wrist, as shown in FIG. 7. Radar transponders 720(1) to 720(n) may, in some examples, be sufficiently flexible to conform to or bend with the user's corresponding body part(s).

In some examples, radar system 700 may determine a range (e.g., distance) from radar device 712 to radar transponders 720(1) to 720(n). Radar system 700 may determine the distance from radar device 712 to radar transponders 720(1) to 720(n) using any suitable method. Radar system 700 may use an FMCW radar method as described above with respect to FIGS. 2-6. Radar system 700 may include radar device 712 that transmits a frequency-modulated radar signal to transponders 720(1) to 720(n) located within a physical environment surrounding a user and a processing device (e.g., baseband controller 522) communicatively coupled to radar device 712. The processing device may detect a signal returned to radar device 712 from at least one of transponders 720(1) to 720(n) in response to the frequency-modulated radar signal. In some examples, the processing device may determine a beat frequency of the returned signal by performing a zero-crossing analysis of the returned signal in the time domain as described above with respect to FIGS. 2-6. The processing device may calculate, based at least in part on the beat frequency of the returned signal, a distance between at least one of transponders 720(1) to 720(n) and radar device 712.

Radar device 712 may transmit a sweeping (e.g., increasing frequency) FMCW radar signal from antenna 708. The radar signal may be received and/or reflected by objects in the vicinity surrounding radar device 712. For example, the radar signal may be reflected by objects including, without limitation, chair 702 and table 704 that may be co-located in a room with radar device 712. The radar signal may be reflected back to radar device 712 and received by antenna 706 and/or antenna 710. The radar signals reflected back from chair 702, table 704, and other objects surrounding radar device 712 may be processed and a distance to those objects may be determined as described in detail above.

Radar device 712 may transmit a sweeping FMCW radar signal from antenna 708 that may be received by transponders 720(1) to 720(n). The transmitted radar signal may be reflected by transponders 720(1) to 720(n). Transponders 720(1) to 720(n) may be active transponders and may appear to radar device 712 as a pinpoint that emits a strong and/or clean monochromatic signal (e.g., a near-perfect sinusoid) that enables faster and more accurate beat frequency detection (using a zero-crossing analysis) than signals returned by traditional radar systems that detect passive targets. The radar signals reflected by transponders 720(1) to 720(n) may be received by antenna 706 and/or antenna 710. The radar signals reflected back from transponders 720(1) to 720(n) may be processed and a distance to each of transponders 720(1) to 720(n) may be determined as described in detail above.

Radar device 712 may receive reflected signals by antenna 706 and/or antenna 710. In some examples, antenna 706 may have a different orientation than antenna 710. In some examples, antenna 706 may be orientated orthogonally to antenna 710. Further, transmit antenna 708 may have a different orientation from antenna 706 and/or antenna 710. Incorporating orthogonal receiving and transmitting antennas on radar device 712 and/or transponders 720(1) to 720(n) may eliminate and/or reduce mutual coupling between each pair of antennas. As such, the strength of the transmitted and returned signals may be amplified. While surrounding objects such as chair 702 and table 704 may reflect the radar signal back to radar device 712 in the same orientation as transmit antenna 708, transponders 720(1) to 720(n) may reflect the radar signal back with an orthogonal polarization to the transmitted signal. In some examples, a signal-to-noise ratio may be increased by detecting a returned signal with an orthogonal polarization to the transmitted signal. For example, because residual mutual coupling increases as signal strength increases, minimizing mutual coupling may enable transponders 720(1) to 720(n) to increase the gain of the returned signal.

In some examples, radar system 700 may track and/or determine the position, orientation, and/or physical location of each of transponders 720(1) to 720(n) and other objects such as chair 702 and table 704. In some examples, radar system 700 may include multiple types of wearable artificial reality devices including wearable device 730. For example, radar system 700 may include a headset including radar device 712 worn on a user's head and wearable device 730 worn on the user's hand. In this example, radar system 700 may track changes in the relative distance between the headset and portions of wearable device 730 that include transponders 720(1) to 720(n). Specifically, radar device 712 secured to the headset may periodically determine the distance between radar device 712 and one or more of transponders 720(1) to 720(n) secured to wearable device 730 (e.g., glove).

FIG. 8 is an illustration of exemplary radar devices and radar transponders that may be used in connection with embodiments of this disclosure. As described above with respect to FIG. 7, radar transponders may be positioned on articles that may be worn or carried by a user. The radar transducers may be used in a radar system to determine the location of the transducers relative to a radar device. Radar system 700 may include a single radar device 712 that determines a distance to transponders 720(1) to 720(n). Radar system 800 of FIG. 8 may include multiple radar devices 812(1) to 812(n) each of which may calculate a distance to transponders 820(1) to 820(n) on wearable device 830 and/or objects such as chair 802. Each of radar devices 812(1) to 812(n) may include antennas 806(1), 808(1), and 810(1) to 806(n), 808(n), and 810(n), respectively, and compute a distance to transponders 820(1) to 820(n) according to the methods described above with respect to FIGS. 2-7.

In some examples, radar system 800 may include multiple radar devices 812(1) to 812(n) that are secured to a wearable headset. In one embodiment, each of radar devices 812(1) to 812(n) may be separated by at least a certain distance. Additionally or alternatively, radar devices 812(1) to 812(n) may be distributed in a certain pattern or configuration across and/or along the wearable headset. For example, the wearable headset may include radar devices 812(1) and 812(2) located near each of the user's ears and radar device 812(n) located near the top of the user's head. Such a configuration may facilitate three-dimensional localization using triangulation techniques for each transponder 820(1) to 820(n) on wearable device 830. For example, each radar device on the wearable headset may transmit the frequency-modulated radar signal to each transponder 820(1) to 820(n) and receive a returned signal in response. In another example, a single radar device may transmit the frequency-modulated radar signal and each of radar devices 812(1) to 812(n) may receive the returned signal. Based on a combined analysis of the returned signals received by each of radar devices 812(1) to 812(n), a processing device may determine a three-dimensional location of each transponder 820(1) to 820(n) and objects such as chair 802 within the physical environment surrounding the user.

FIG. 9 illustrates a flowchart of an example method 900 of calculating a distance between a transponder and a radar device by detecting zero-crossings of a beat frequency signal. As shown in FIG. 9, the method may include, at step 910, transmitting, by at least one radar device, a frequency-modulated radar signal to at least one transponder located within a physical environment surrounding a user. At step 920, the method may include detecting, by a processing device communicatively coupled to the at least one radar device, a signal returned to the at least one radar device from the at least one transponder in response to the frequency-modulated radar signal. At step 930, the method may include determining a beat frequency of the returned signal by performing a zero-crossing analysis of the returned signal in the time domain. At step 940, the method may include calculating, based at least in part on the beat frequency of the returned signal, a distance between the at least one transponder and the at least one radar device.

Example 1: A radar system comprising at least one radar device that transmits a frequency-modulated radar signal to at least one transponder located within a physical environment surrounding a user and a processing device communicatively coupled to the at least one radar device. The processing device may (1) detect a signal returned to the at least one radar device from the at least one transponder in response to the frequency-modulated radar signal, (2) determine a beat frequency of the returned signal by performing a zero-crossing analysis of the returned signal in the time domain, and (3) calculate, based at least in part on the beat frequency of the returned signal, a distance between the at least one transponder and the at least one radar device.

Example 2: The radar system of example 1, wherein the radar system comprises a circuit configured to determine the beat frequency of the returned signal.

Example 3: The radar system of any of examples 1 or 2, wherein (1) the frequency-modulated radar signal sweeps between an initial frequency and a final frequency, (2) the processing device determines the beat frequency of the returned signal before the frequency of the swept frequency-modulated radar signal reaches the final frequency, and (3) in response to determining the beat frequency, the processing device directs the at least one radar device to reset the frequency-modulated radar signal such that the frequency-modulated radar signal returns to the initial frequency.

Example 4: The radar system of any of examples 1, 2, or 3, wherein a period of time the radar signal sweeps between the initial frequency and the final frequency is based on a distance between the at least one transponder and the at least one radar device.

Example 5: The radar system of example 1, wherein performing a zero-crossing analysis of the returned signal in the time domain comprises (1) mixing the returned signal with a reference signal, (2) detecting at least two successive instances when the amplitude of the mixed signal crosses a threshold, and (3) measuring a time interval between the at least two successive instances when the amplitude of the mixed signal crosses the threshold.

Example 6: The radar system of example 5, wherein measuring a time interval between the at least two successive instances when the amplitude of the mixed signal crosses the threshold comprises (1) determining an envelope of the mixed signal, (2) rectifying the mixed signal, (3) filtering the mixed signal to retain the envelope, (4) detecting at least two successive threshold crossings of the envelope, and (5) measuring the time interval between the at least two successive threshold crossings of the envelope.

Example 7: The radar system of example 6, wherein (1) rectifying the mixed signal is based on a diode bridge circuit, (2) filtering the mixed signal to retain the envelope is based on a low pass filter circuit, (3) detecting the at least two successive threshold crossings of the envelope is based on an amplitude comparator circuit, and (4) measuring the time interval between the at least two successive threshold crossings is based on a digital timing circuit.

Example 8: The radar system of example 1, further comprising identifying the at least one transponder among a plurality of transponders, wherein identifying the at least one transponder is based on the beat frequency.

Example 9: The radar system of example 8, further comprising identifying each transponder among the plurality of transponders.

Example 10: The radar system of example 1, wherein (1) the at least one radar device is secured to a first wearable device dimensioned to be worn by a user of an artificial reality system, and (2) the at least one transponder is secured to a second wearable device dimensioned to be worn by the user of the artificial reality system.

Example 11: The radar system of example 1, wherein the processing device further (1) determines, based at least in part on the distance between the at least one transponder and the at least one radar device, a change in a position of at least a portion of the user within the physical environment, and (2) facilitates modifying at least one virtual component of the artificial reality system to account for the change in the position of the portion of the user.

Example 12: A method comprising (1) transmitting, by at least one radar device, a frequency-modulated radar signal to at least one transponder located within a physical environment surrounding a user, (2) detecting, by a processing device communicatively coupled to the at least one radar device a signal returned to the at least one radar device from the at least one transponder in response to the frequency-modulated radar signal, (3) determining a beat frequency of the returned signal by performing a zero-crossing analysis of the returned signal in the time domain, and (4) calculating, based at least in part on the beat frequency of the returned signal, a distance between the at least one transponder and the at least one radar device.

Example 13: The method of example 12, wherein the at least one radar device comprises a circuit configured to determine the beat frequency of the returned signal.

Example 14: The method of any of examples 12 or 13, wherein (1) the frequency-modulated radar signal sweeps between an initial frequency and a final frequency, the processing device determines the beat frequency of the returned signal before the frequency of the swept frequency-modulated radar signal reaches the final frequency, and (2) in response to determining the beat frequency, the processing device directs the at least one radar device to reset the frequency-modulated radar signal such that the frequency-modulated radar signal returns to the initial frequency.

Example 15: The method of example 14, wherein a period of time the radar signal sweeps between the initial frequency and the final frequency is based on a distance between the at least one transponder and the at least one radar device.

Example 16: The method of example 12, wherein performing a zero-crossing analysis of the returned signal in the time domain comprises (1) mixing the returned signal with a reference signal, (2) detecting at least two successive instances when the amplitude of the mixed signal crosses a threshold, and (3) measuring a time interval between the at least two successive instances when the amplitude of the mixed signal crosses the threshold.

Example 17: The method of example 16, wherein measuring the time interval between the at least two successive instances when the amplitude of the mixed signal crosses the threshold comprises (1) determining an envelope of the mixed signal, (2) rectifying the mixed signal, (3) filtering the mixed signal to retain the envelope, (4) detecting at least two successive threshold crossings of the envelope, and (5) measuring a time interval between the at least two successive threshold crossings of the envelope.

Example 18: The method of example 17, wherein (1) rectifying the mixed signal is based on a diode bridge circuit, (2) filtering the mixed signal to retain the envelope is based on a low pass filter circuit, (3) detecting the at least two successive threshold crossings of the envelope is based on an amplitude comparator circuit, and (4) measuring the time interval between the at least two successive threshold crossings is based on a digital timing circuit.

Example 19: The method of example 12, further comprising identifying the at least one transponder among a plurality of transponders, wherein identifying the at least one transponder is based on the beat frequency.

Example 20: A computer-readable medium comprising computer-readable instructions that, when executed by at least one processor of a computing device, cause the computing device to (1) transmit a frequency-modulated radar signal from at least one radar device to at least one transponder located within a physical environment surrounding a user, (2) detect a signal returned to the at least one radar device from the at least one transponder in response to the frequency-modulated radar signal, (3) determine a beat frequency of the returned signal by performing a zero-crossing analysis of the returned signal in the time domain, and (4) calculate, based at least in part on the beat frequency of the returned signal, a distance between the at least one transponder and the at least one radar device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

As detailed above, the computing devices and systems described and/or illustrated herein broadly represent any type or form of computing device or system capable of executing computer-readable instructions. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 1000 in FIG. 10. Other artificial reality systems may include a NED that also provides visibility into the real world (e.g., augmented-reality system 1100 in FIG. 11) or that visually immerses a user in an artificial reality (e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
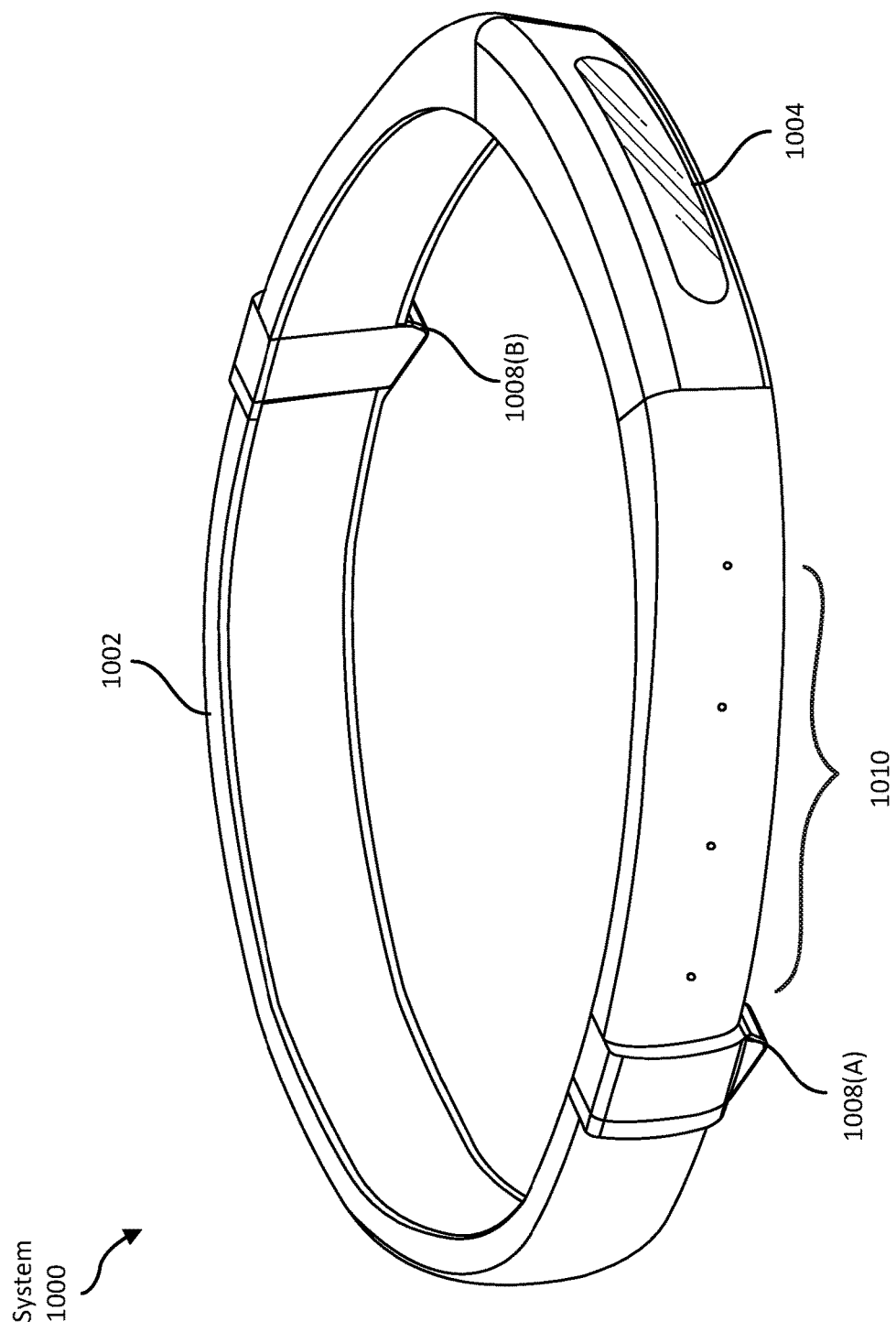
FIG. 10 is an illustration of an exemplary artificial-reality headband that may be used in connection with embodiments of this disclosure.

Turning to FIG. 10, augmented-reality system 1000 generally represents a wearable device dimensioned to fit about a body part (e.g., a head) of a user. As shown in FIG. 10, system 1000 may include a frame 1002 and a camera assembly 1004 that is coupled to frame 1002 and configured to gather information about a local environment by observing the local environment. Augmented-reality system 1000 may also include one or more audio devices, such as output audio transducers 1008(A) and 1008(B) and input audio transducers 1010. Output audio transducers 1008(A) and 1008(B) may provide audio feedback and/or content to a user, and input audio transducers 1010 may capture audio in a user's environment.

As shown, augmented-reality system 1000 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1000 may not include a NED, augmented-reality system 1000 may include other types of screens or visual feedback devices (e.g., a display screen integrated into a side of frame 1002).

Figure 11:
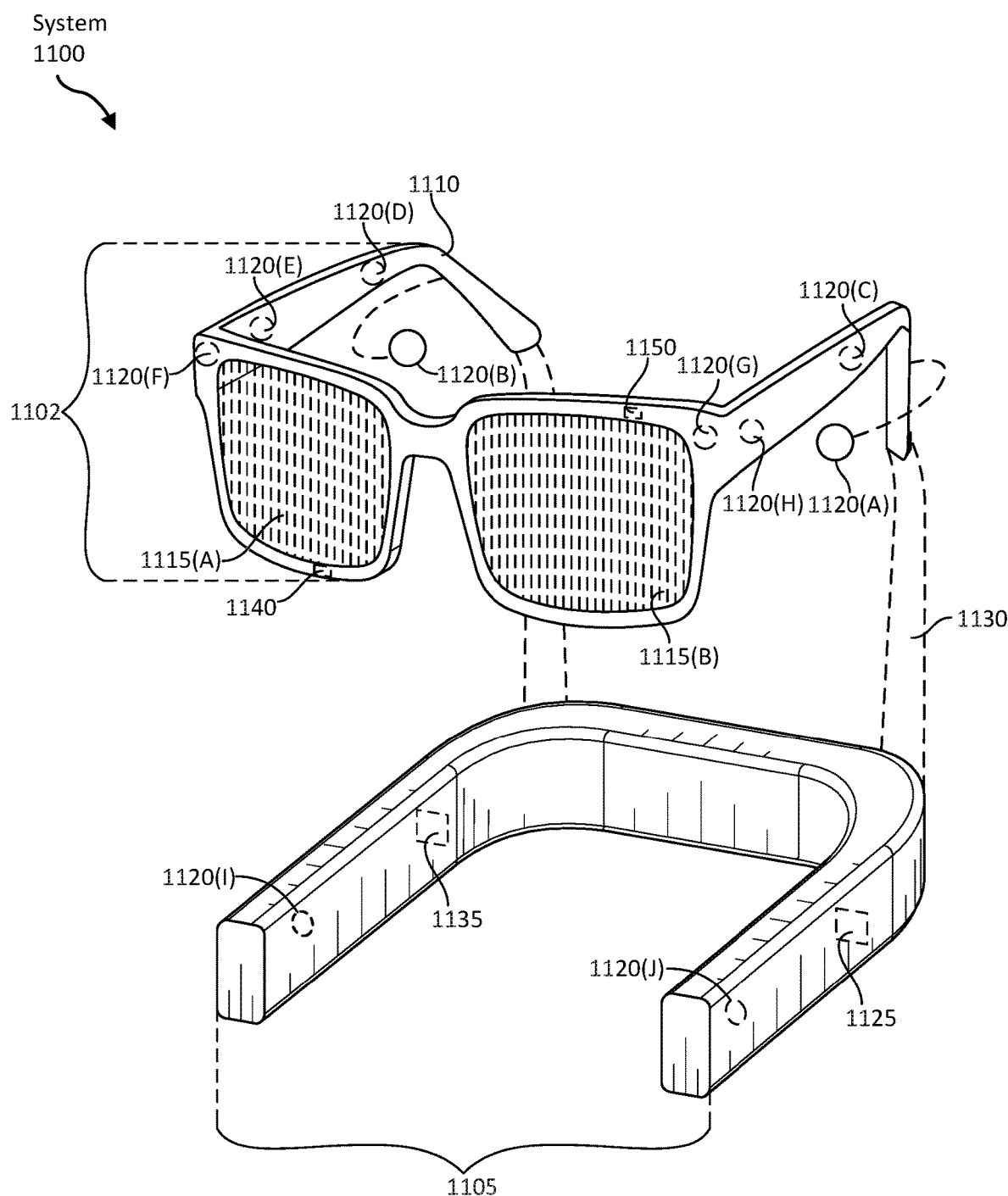
FIG. 11 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent a position sensor, an inertial measurement unit (IMU), a depth camera assembly, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

Augmented-reality system 1100 may also include a microphone array with a plurality of acoustic transducers 1120(A)-1120(J), referred to collectively as acoustic transducers 1120. Acoustic transducers 1120 may be transducers that detect air pressure variations induced by sound waves. Each acoustic transducer 1120 may be configured to detect sound and convert the detected sound into an electronic format (e.g., an analog or digital format). The microphone array in FIG. 2 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by the controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer, or some combination thereof.

Acoustic transducers 1120(A) and 1120(B) may be positioned on different parts of the user's ear, such as behind the pinna or within the auricle or fossa. Or, there may be additional acoustic transducers on or surrounding the ear in addition to acoustic transducers 1120 inside the ear canal. Having an acoustic transducer positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments, acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned along the length of the temples, across the bridge, above or below display devices 1115(A) and 1115(B), or some combination thereof. Acoustic transducers 1120 may be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers and other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof. Furthermore, Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1200 and/or virtual-reality system 1200 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1000, augmented-reality system 1100, and/or virtual-reality system 1200 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 10 and 12, output audio transducers 1008 (A), 1008(B), 1206(A), and 1206(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1010 may include condenser microphones, dynamic microphones, ribbon microphones, and/or any other type or form of input transducer. In some embodiments, a single transducer may be used for both audio input and audio output.

Figure 12:
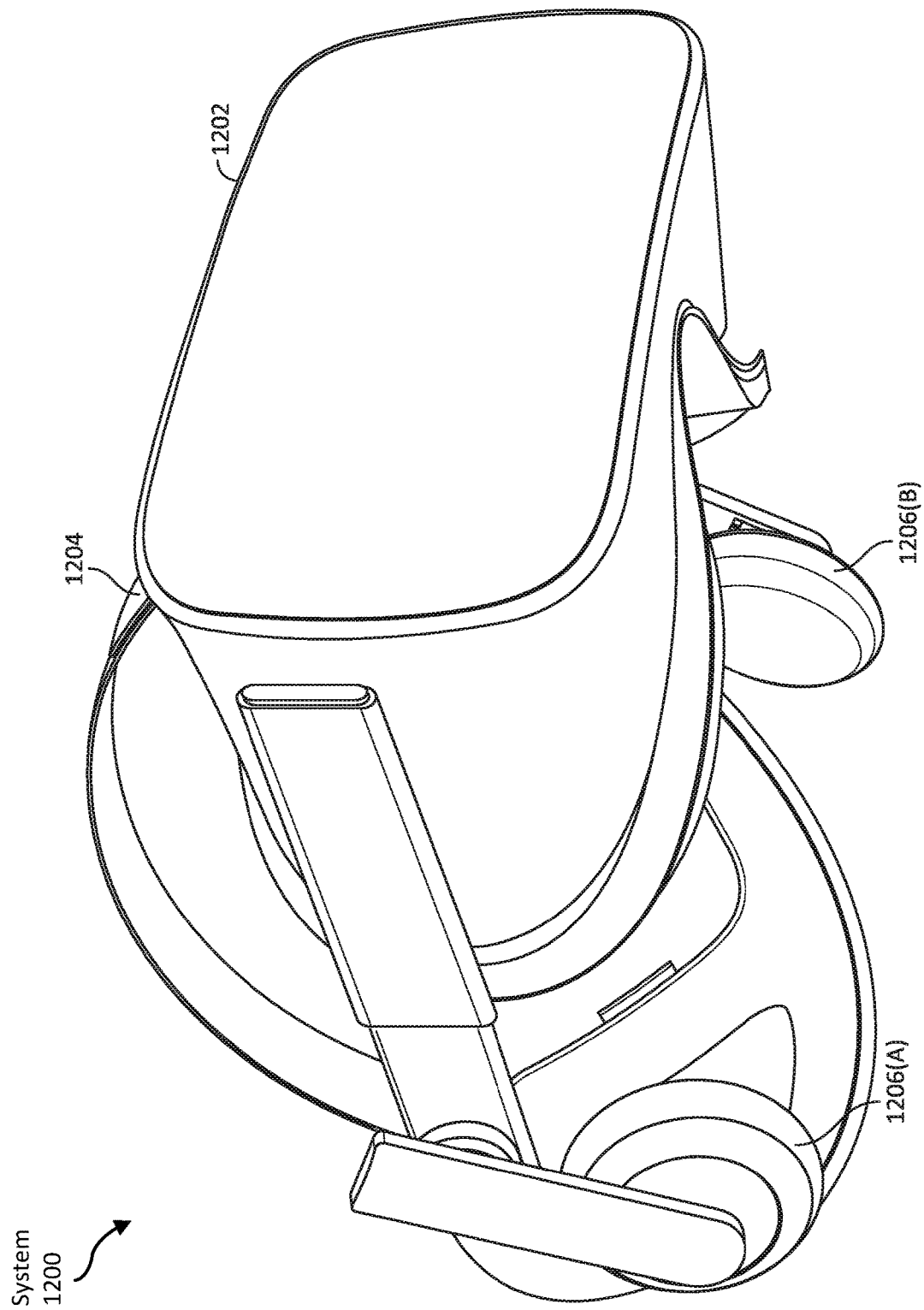
FIG. 12 is an illustration of an exemplary virtual-reality headset that may be used in connection with embodiments of this disclosure.

While not shown in FIGS. 10-12, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 1000, 1100, and 1200 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
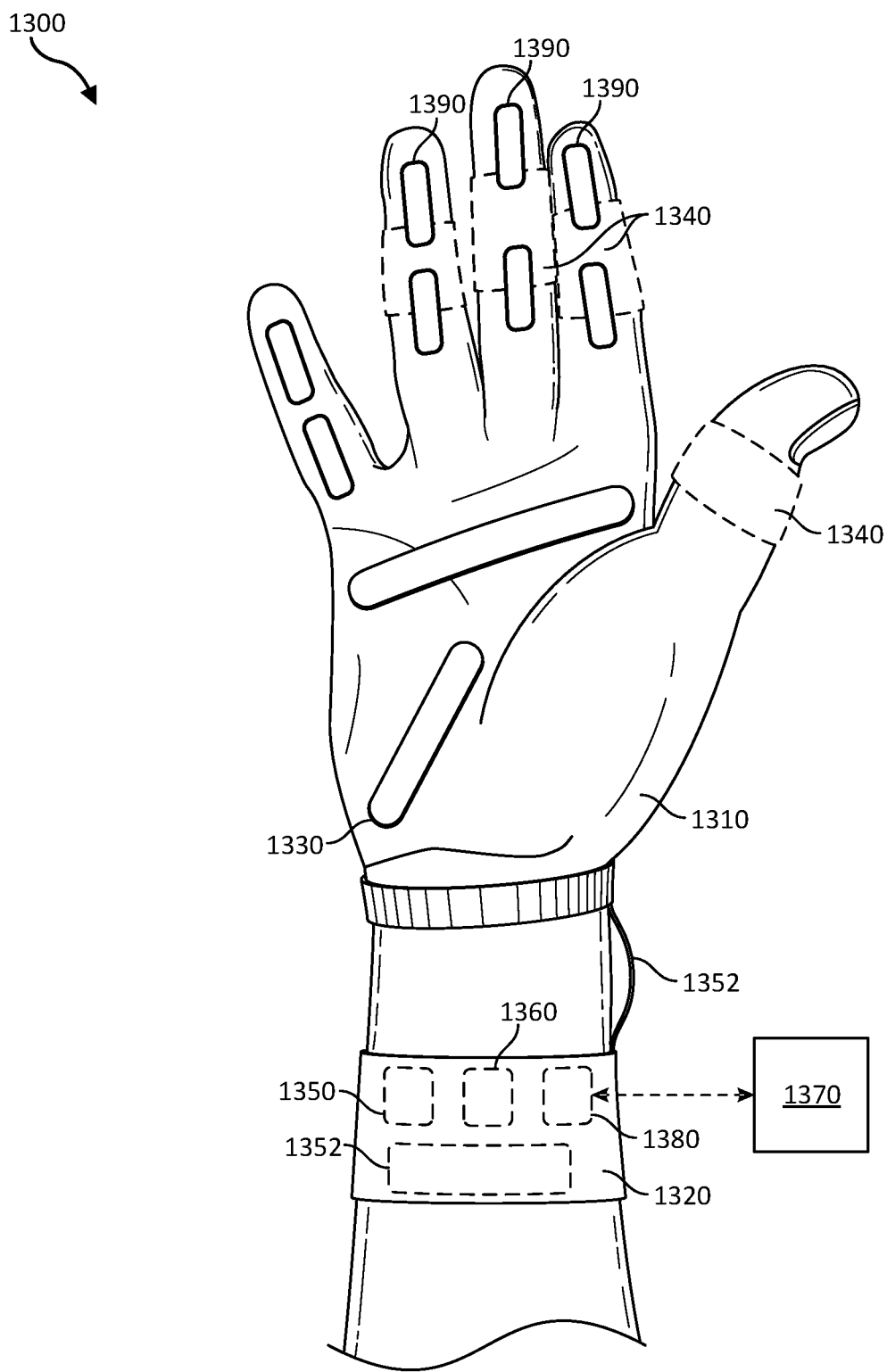
FIG. 13 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). Haptic device 1310 and haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned to be against the user's finger(s), thumb, or wrist, as shown in FIG. 13. Vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1380 may enable communications between vibrotactile system 1300 and the other device or system 1370 via a wireless (e.g., Wi-Fi, Bluetooth, cellular, radio, etc.) link or a wired link. If present, communications interface 1380 may be in communication with processor 1360, such as to provide a signal to processor 1360 to activate or deactivate one or more of the vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
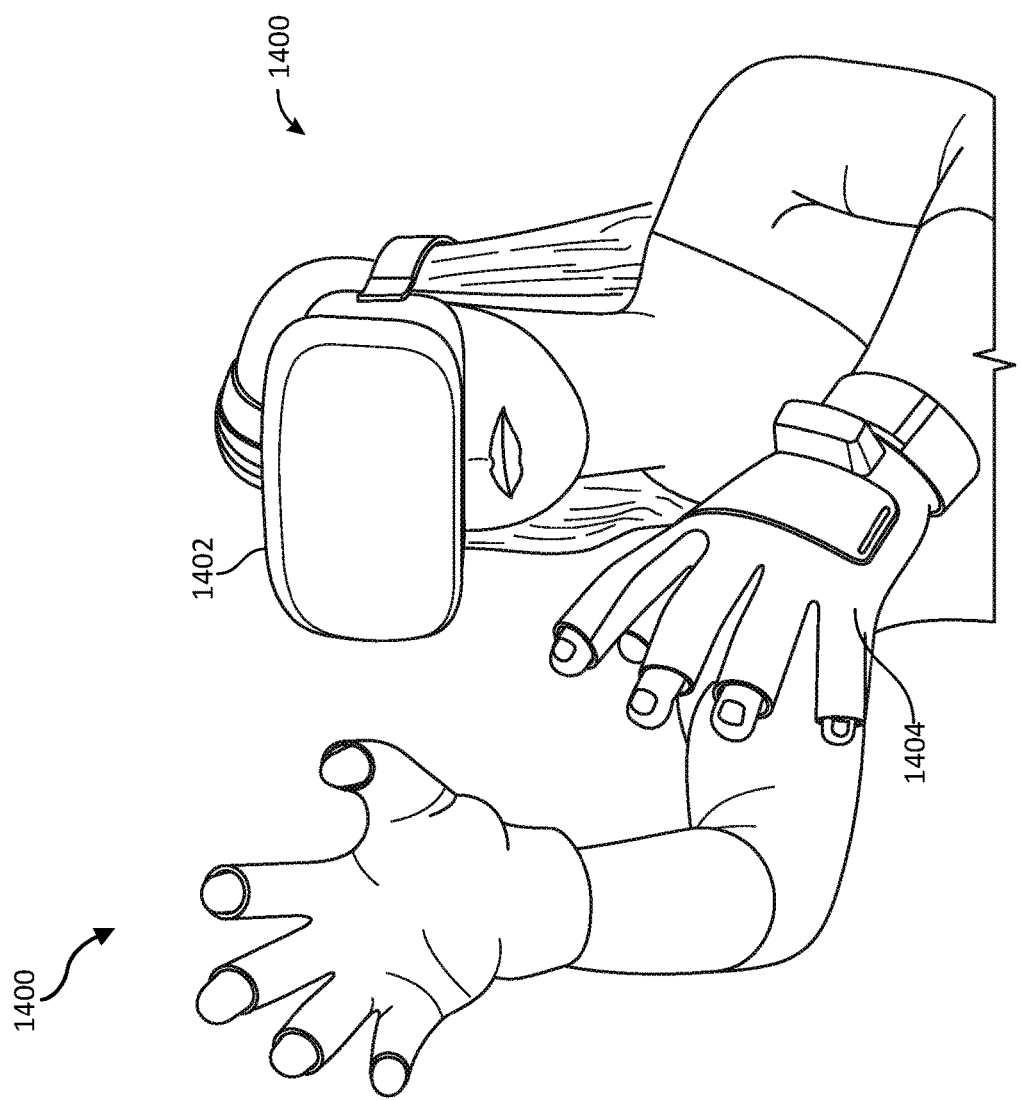
FIG. 14 is an illustration of an exemplary virtual-reality environment according to embodiments of this disclosure.

Haptic wearables, such as those shown in and described in connection with FIG. 13, may be implemented in a variety of types of artificial-reality systems and environments. FIG. 14 shows an example artificial reality environment 1400 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1402 generally represents any type or form of virtual-reality system, such as virtual-reality system 1200 in FIG. 12. Haptic device 1404 generally represents any type or form of wearable device, worn by a use of an artificial reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

Figure 15:
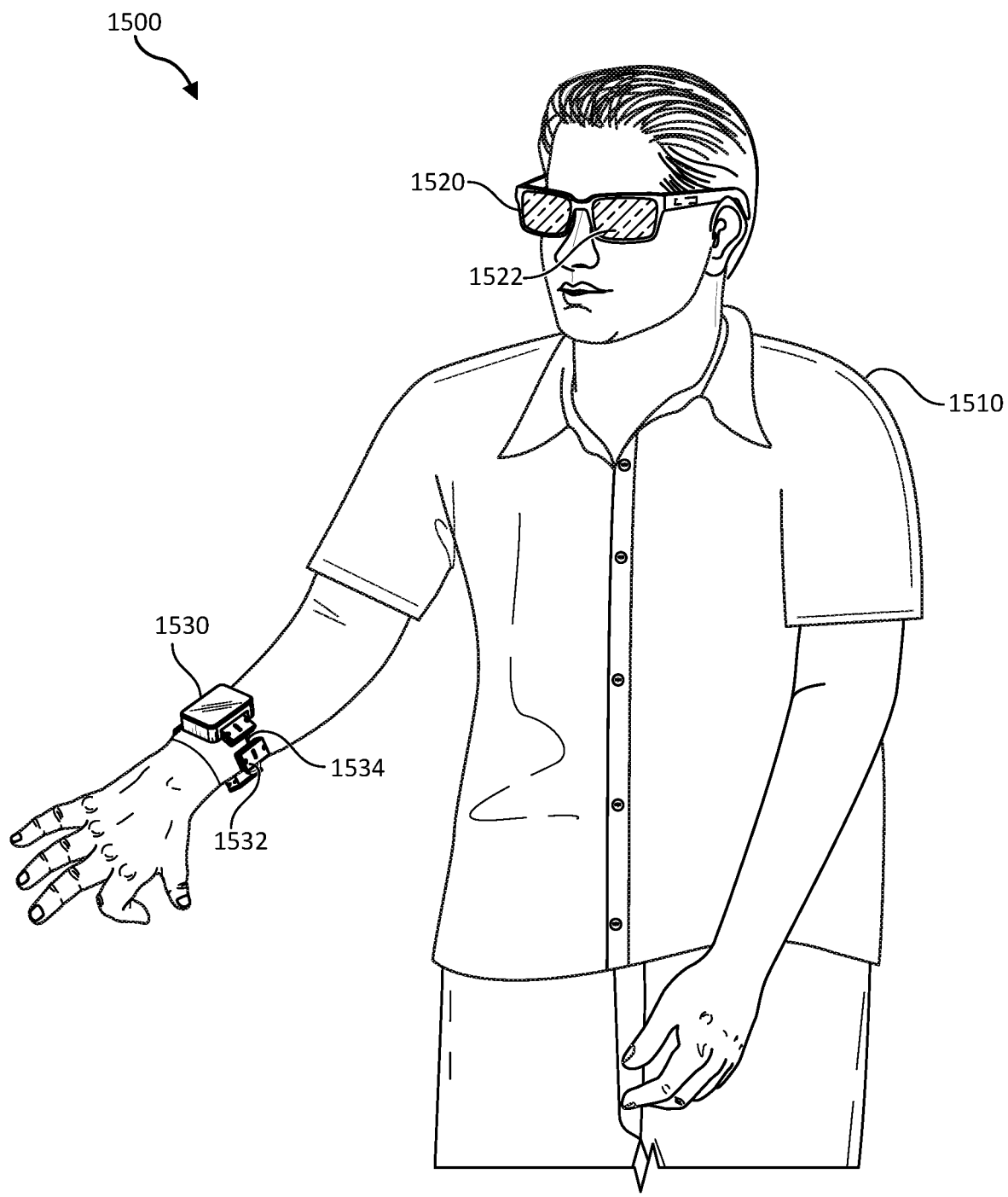
FIG. 15 is an illustration of an exemplary augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view a user 1510 interacting with an augmented-reality system 1500. In this example, user 1510 may wear a pair of augmented-reality glasses 1520 that have one or more displays 1522 and that are paired with a haptic device 1530. Haptic device 1530 may be a wristband that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A radar system comprising:
   at least one radar device that:
   transmits a frequency-modulated radar signal that sweeps between an initial frequency and a final frequency to at least one transponder located within a physical environment surrounding a user; and
   a processing device communicatively coupled to the at least one radar device, wherein the processing device:
   detects a signal returned to the at least one radar device from the at least one transponder in response to the frequency-modulated radar signal;
   determines a beat frequency of the returned signal before the frequency of the swept frequency-modulated radar signal reaches the final frequency by performing a zero-crossing analysis of the returned signal in the time domain;
   in response to determining the beat frequency, directs the at least one radar device to reset the frequency-modulated radar signal such that the frequency-modulated radar signal immediately returns to the initial frequency; and calculates, based at least in part on the beat frequency of the returned signal, a distance between the at least one transponder and the at least one radar device.

2. The radar system of claim 1, wherein the radar system comprises a circuit configured to determine the beat frequency of the returned signal.

3. The radar system of claim 1, wherein a period of time the radar signal sweeps between the initial frequency and the final frequency is based on the distance between the at least one transponder and the at least one radar device.

4. The radar system of claim 1, wherein performing the zero-crossing analysis of the returned signal in the time domain comprises:

mixing the returned signal with a reference signal;

detecting at least two successive instances when the amplitude of the mixed signal crosses a threshold; and measuring a time interval between the at least two successive instances when the amplitude of the mixed signal crosses the threshold.

5. The radar system of claim 4, wherein measuring the time interval between the at least two successive instances when the amplitude of the mixed signal crosses the threshold comprises:

filtering the mixed signal;

rectifying the mixed signal;

determining an envelope of the mixed signal;

detecting at least two successive threshold crossings of the envelope; and measuring a time interval between the at least two successive threshold crossings of the envelope.

6. The radar system of claim 5, wherein:

rectifying the mixed signal is based on a diode bridge circuit, filtering the mixed signal to retain the envelope is based on a low pass filter circuit, detecting the at least two successive threshold crossings of the envelope is based on an amplitude comparator circuit, and measuring the time interval between the at least two successive threshold crossings is based on a digital timing circuit.

7. The radar system of claim 1, further comprising identifying the at least one transponder among a plurality of transponders, wherein identifying the at least one transponder is based on the beat frequency.

8. The radar system of claim 7, further comprising identifying each transponder among the plurality of transponders.

9. The radar system of claim 1, wherein:

the at least one radar device is secured to a first wearable device dimensioned to be worn by the user of an artificial reality system; and the at least one transponder is secured to a second wearable device dimensioned to be worn by the user of the artificial reality system.

10. The radar system of claim 9, wherein the processing device further:

determines, based at least in part on the distance between the at least one transponder and the at least one radar device, a change in a position of at least a portion of the user within the physical environment; and facilitates modifying at least one virtual component of the artificial reality system to account for the change in the position of the portion of the user.

11. A method comprising:

transmitting, by at least one radar device, a frequency-modulated radar signal that sweeps between an initial frequency and a final frequency to at least one transponder located within a physical environment surrounding a user;

detecting, by a processing device communicatively coupled to the at least one radar device a signal returned to the at least one radar device from the at least one transponder in response to the frequency-modulated radar signal;

determining a beat frequency of the returned signal before the frequency of the swept frequency-modulated radar signal reaches the final frequency by performing a zero-crossing analysis of the returned signal in the time domain;

in response to determining the beat frequency, directing the at least one radar device to reset the frequency-modulated radar signal such that the frequency-modulated radar signal immediately returns to the initial frequency; and calculating, based at least in part on the beat frequency of the returned signal, a distance between the at least one transponder and the at least one radar device.

12. The method of claim 11, wherein the at least one radar device comprises a circuit configured to determine the beat frequency of the returned signal.

13. The method of claim 11, wherein a period of time the radar signal sweeps between the initial frequency and the final frequency is based on the distance between the at least one transponder and the at least one radar device.

14. The method of claim 11, wherein performing the zero-crossing analysis of the returned signal in the time domain comprises:

mixing the returned signal with a reference signal;

detecting at least two successive instances when the amplitude of the mixed signal crosses a threshold; and measuring a time interval between the at least two successive instances when the amplitude of the mixed signal crosses the threshold.

15. The method of claim 14, wherein measuring the time interval between the at least two successive instances when the amplitude of the mixed signal crosses the threshold comprises:

filtering the mixed signal;

rectifying the mixed signal;

determining an envelope of the mixed signal;

detecting at least two successive threshold crossings of the envelope; and measuring a time interval between the at least two successive threshold crossings of the envelope.

16. The method of claim 15, wherein:

rectifying the mixed signal is based on a diode bridge circuit, filtering the mixed signal to retain the envelope is based on a low pass filter circuit, detecting the at least two successive threshold crossings of the envelope is based on an amplitude comparator circuit, and measuring the time interval between the at least two successive threshold crossings is based on a digital timing circuit.

17. The method of claim 11, further comprising identifying the at least one transponder among a plurality of transponders, wherein identifying the at least one transponder is based on the beat frequency.

18. A non-transitory computer-readable medium comprising:
- computer-readable instructions that, when executed by at least one processor of a computing device, cause the computing device to:
- transmit a frequency-modulated radar signal that sweeps between an initial frequency and a final frequency from at least one radar device to at least one transponder located within a physical environment surrounding a user;
- detect a signal returned to the at least one radar device from the at least one transponder in response to the frequency-modulated radar signal;
- determine a beat frequency of the returned signal before the frequency of the swept frequency-modulated radar signal reaches the final frequency by performing a zero-crossing analysis of the returned signal in the time domain;
- in response to determining the beat frequency, direct the at least one radar device to reset the frequency-modulated radar signal such that the frequency-modulated radar signal immediately returns to the initial frequency; and
- calculate, based at least in part on the beat frequency of the returned signal, a distance between the at least one transponder and the at least one radar device.

\* \* \* \* \*

UNITED STATES PATENT AND TRADEMARK OFFICE
CERTIFICATE OF CORRECTION

| | | |
|---|---|---|
| PATENT NO. | : 11,221,404 B1 | Page 1 of 1 |
| APPLICATION NO. | : 16/526736 | |
| DATED | : January 11, 2022 | |
| INVENTOR(S) | : DeSalvo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 227 days.

Signed and Sealed this
Twenty-ninth Day of November, 2022

Katherine Kelly Vidal
*Director of the United States Patent and Trademark Office*